US012693618B2

(12) United States Patent
Katagiri et al.

(10) Patent No.: US 12,693,618 B2
(45) Date of Patent: Jul. 28, 2026

(54) IMAGE FORMING APPARATUS

(71) Applicant: CANON KABUSHIKI KAISHA, Tokyo (JP)

(72) Inventors: Hiroko Katagiri, Tokyo (JP); Akinori Mitsumata, Tokyo (JP); Shingo Ito, Tokyo (JP); Ai Suzuki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/753,392

(22) Filed: Jun. 25, 2024

(65) Prior Publication Data

US 2024/0427279 A1 Dec. 26, 2024

(30) Foreign Application Priority Data

Jun. 26, 2023 (JP) ................................ 2023-103929

(51) Int. Cl.
*G03G 21/16* (2006.01)
*G03G 15/00* (2006.01)

(52) U.S. Cl.
CPC ..... *G03G 15/6579* (2013.01); *G03G 15/6529* (2013.01); *G03G 15/751* (2013.01); *G03G 21/168* (2013.01)

(58) Field of Classification Search
CPC ............ G03G 21/168; G03G 15/6529; G03G 21/1676; G03G 21/1647; G03G 15/6579
See application file for complete search history.

(56) References Cited

U.S. PATENT DOCUMENTS

| | | | | |
|---|---|---|---|---|
| 2015/0277333 | A1* | 10/2015 | Sato | B65H 29/14 399/405 |
| 2016/0251181 | A1* | 9/2016 | Izumichi | B65H 85/00 271/225 |
| 2017/0088373 | A1* | 3/2017 | Tahara | B65H 3/0684 |
| 2017/0102647 | A1* | 4/2017 | Wakimoto | G03G 15/2028 |
| 2023/0176509 | A1* | 6/2023 | Yokota | G03G 15/2028 399/322 |

FOREIGN PATENT DOCUMENTS

JP 2001183905 A 7/2001

* cited by examiner

*Primary Examiner* — Jessica L Eley
(74) *Attorney, Agent, or Firm* — Canon U.S.A., Inc. IP Division

(57) ABSTRACT

An image forming apparatus includes (i) an apparatus main body including a discharge portion and a wall disposed on an opposite side to the discharge portion with respect to a horizontal direction, the discharge portion including a first opening, and the wall including a second opening, (ii) a photosensitive drum disposed below the first opening and the second opening, (iii) an exposed surface exposed toward a first communication path communicating with the first opening and the second opening and disposed below the first communication path. The image forming apparatus includes a receiving surface projecting from the exposed surface toward the first communication path. The receiving surface is upwardly oriented with respect to the vertical direction and faces the first communication path. The receiving surface is inclined relative to the vertical direction and the horizontal direction.

21 Claims, 16 Drawing Sheets

IMAGE FORMING APPARATUS

BACKGROUND

Field

The present disclosure relates to electrophotographic image forming apparatuses such as copying machines and printers.

Description of the Related Art

With an image forming apparatus using an electrophotographic process, a toner image formed on the surface of a photosensitive drum as an image bearing member is transferred to a recording medium by a transfer member and then fixed to the recording medium by a fixing unit.

Japanese Patent Application Laid-Open No. 2001-183905 discusses an image forming apparatus using a cleaner-less method (simultaneous development and cleaning) in which a transfer residual toner remaining on a photosensitive drum is collected by a development device for reuse.

The apparatus main body of an image forming apparatus may be provided with an opening for releasing heat and steam generated in a fixing unit out of the apparatus main body. Preferably, if a foreign substance such as dust enters the apparatus main body from an opening of the apparatus main body, the foreign substance is prevented from adhering to the photosensitive drum. In particular, an image forming apparatus using the cleaner-less method as discussed in Japanese Patent Application Laid-Open No. 2001-183905 includes no cleaning unit for cleaning a residual toner on the photosensitive drum. Therefore, it is more preferable to prevent foreign substances from adhering to the photosensitive drum.

SUMMARY

The present disclosure is directed to preventing foreign substances from adhering to a photosensitive drum.

An aspect of the present according to the present application will be described below.

According to an aspect of the present disclosure, an image forming apparatus for forming an image on a recording medium, the image forming apparatus includes an apparatus main body including a discharge portion and a wall disposed on an opposite side to the discharge portion with respect to a horizontal direction, wherein the discharge portion includes a first opening for discharging the recording medium, and the wall includes a second opening, a photosensitive drum stored in the apparatus main body, wherein the photosensitive drum is rotatable and disposed below the first opening and the second opening with respect to a vertical direction, an exposed surface stored in the apparatus main body, wherein the exposed surface is exposed toward a first communication path communicating with the first opening and the second opening and disposed below the first communication path, a plurality of ribs arranged along a rotational axis direction of the photosensitive drum, wherein the plurality of ribs projects from the exposed surface toward the first communication path, and each of the plurality of ribs extends in a direction intersecting with the rotational axis direction, and a receiving surface projecting from the exposed surface toward the first communication path, wherein the receiving surface is upwardly oriented with respect to the vertical direction and faces the first communication path, and the receiving surface extends along the rotational axis direction to connect with the plurality of ribs and is disposed to be positioned above the photosensitive drum with respect to the vertical direction, and wherein the receiving surface is inclined relative to the vertical direction and the horizontal direction so that a leading end of the receiving surface is disposed above a root of the receiving surface connecting with the exposed surface.

Further features of the present disclosure will become apparent from the following description of exemplary embodiments with reference to the attached drawings.

DESCRIPTION OF THE EMBODIMENTS

Exemplary embodiments of the present disclosure will be described as illustrative in detail below with reference to the accompanying drawings. However, sizes, materials, shapes, and relative arrangements of components according to the following exemplary embodiments are to be modified as required depending on the configuration of an apparatus according to the present disclosure and other various conditions. Therefore, unless otherwise specifically described, the scope of the present disclosure is not limited to the following exemplary embodiments.

(Overall Configuration of Image Forming Apparatus)

Figure 1:
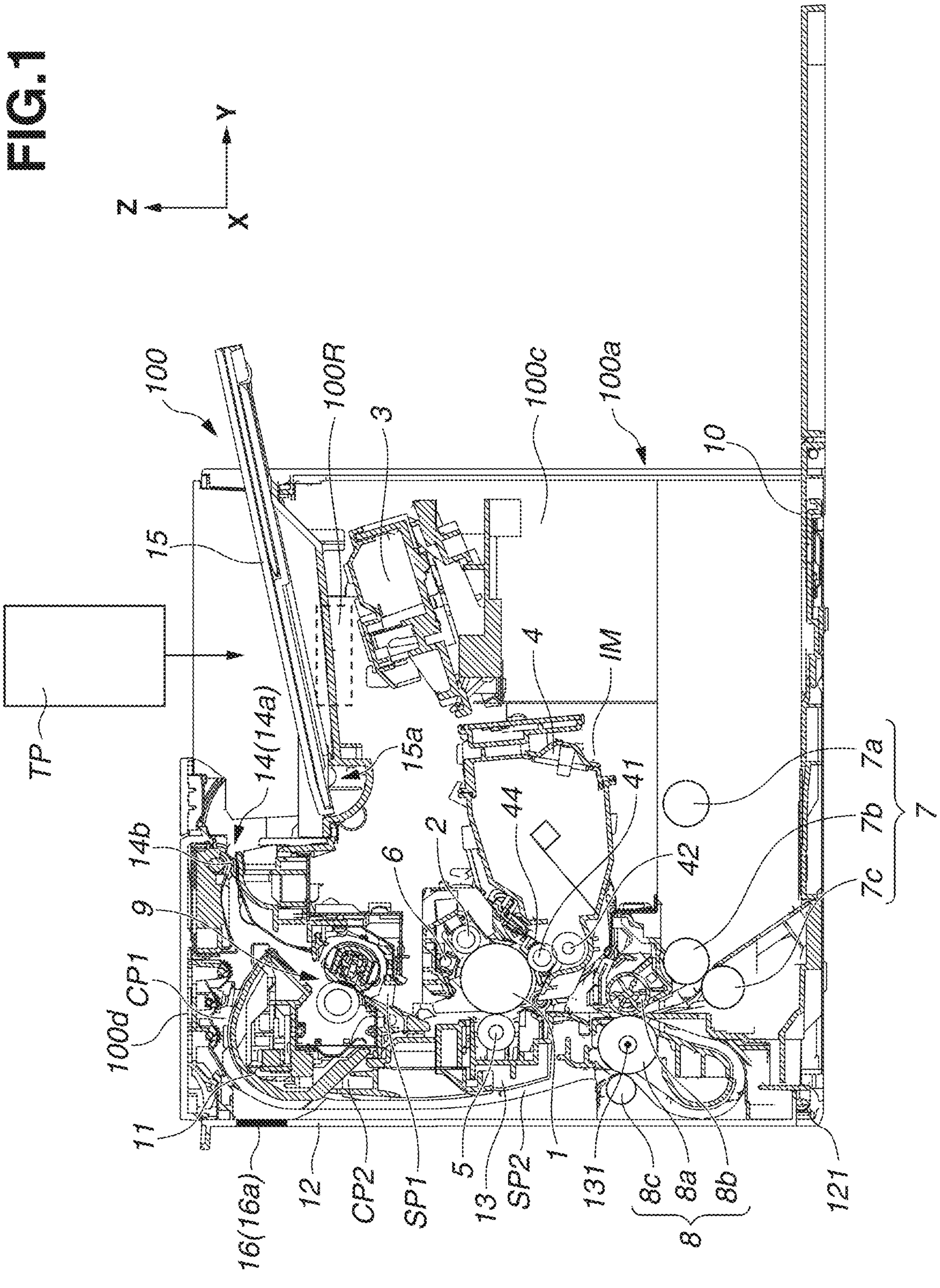
FIG. 1 is a cross-sectional view illustrating an image forming apparatus.
Figure 2A:
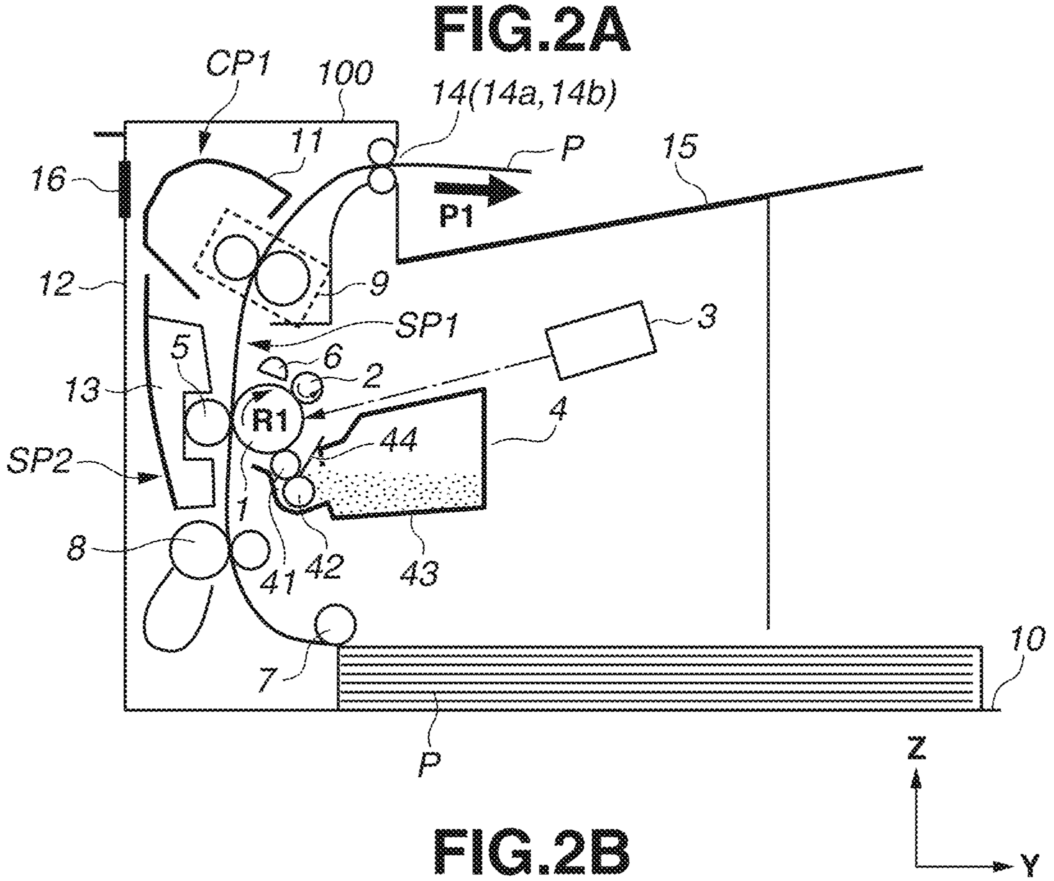
FIGS. 2A and 2B are schematic cross-sectional views illustrating the image forming apparatus.
Figure 2B:
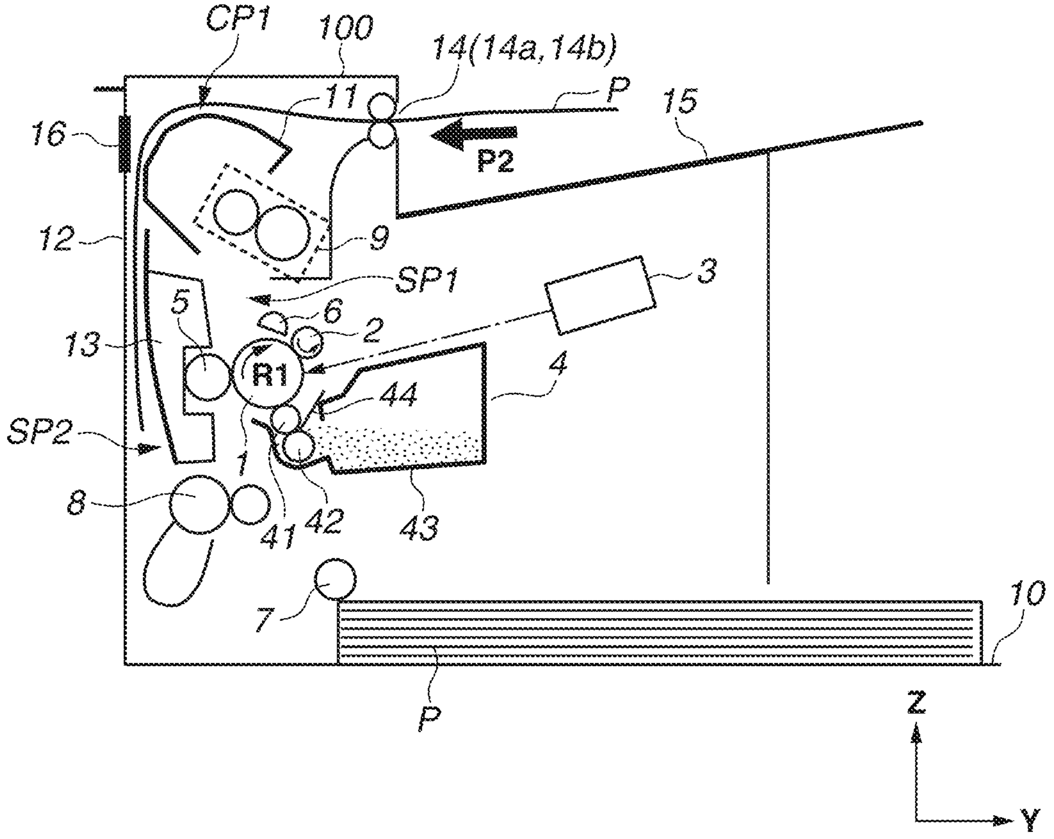
Figure 3:
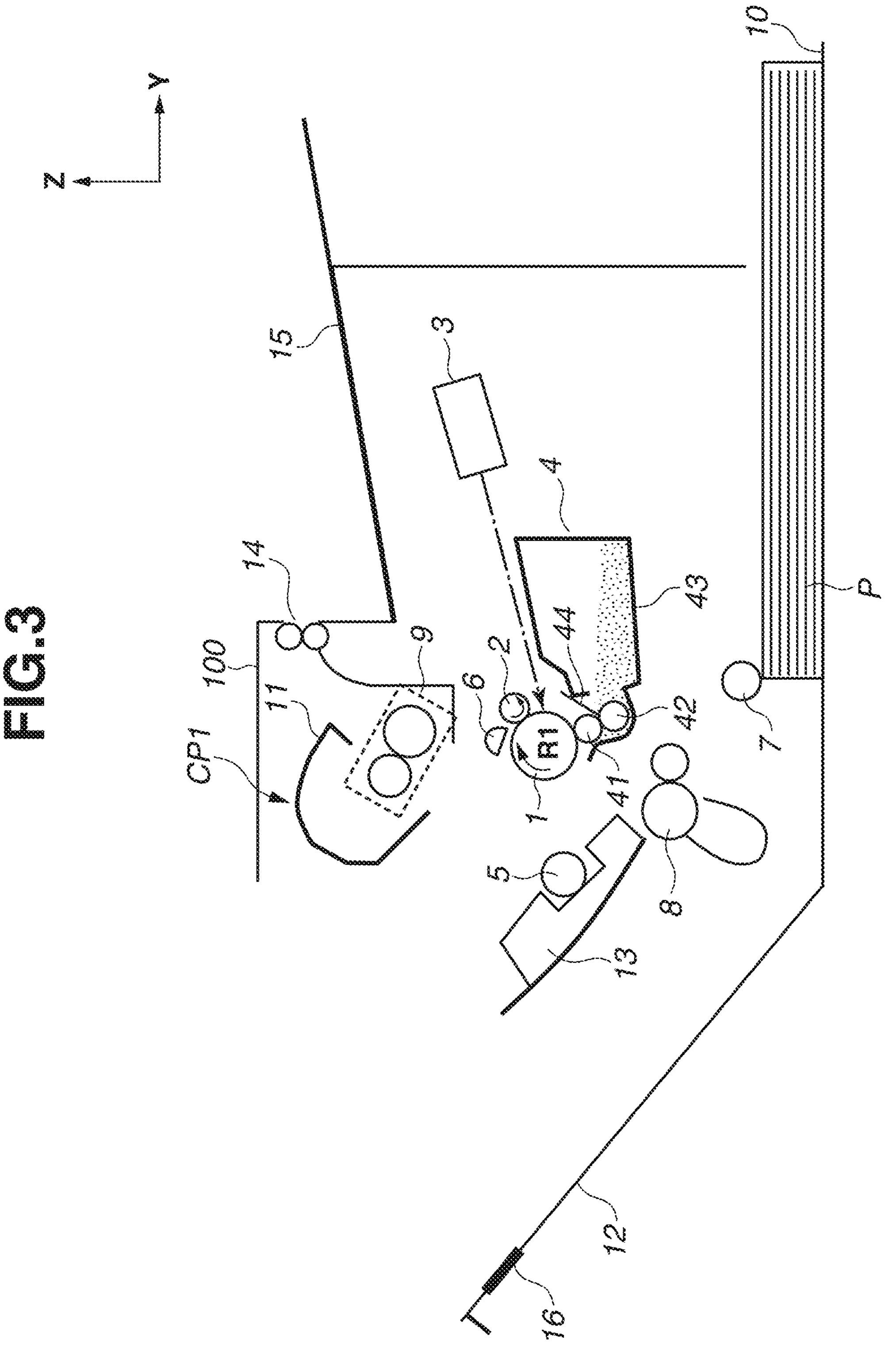
FIG. 3 is a schematic cross-sectional view illustrating the image forming apparatus.

An overall configuration of an image forming apparatus 100 will be described below with reference to FIGS. 1, 2A, 2B, and 3. FIG. 1 is a cross-sectional view illustrating the image forming apparatus 100. FIGS. 2A and 2B are schematic cross-sectional views illustrating the conveyance of a recording medium P in the image forming apparatus 100. FIG. 3 is a schematic cross-sectional view illustrating the movements of a door 12 and a transfer guide 13 of the image forming apparatus 100. FIGS. 1, 2A, 2B, and 3 illustrate the image forming apparatus 100 when viewed in the rotational axis direction of a photosensitive drum 1 (described below).

In the following descriptions, the vertical direction in a state where the image forming apparatus 100 is disposed on a horizontal surface is referred to as the Z direction. The Z direction is opposite to the gravity direction. The height direction of the image forming apparatus 100 is a direction parallel to the Z direction and opposite to the gravity direction. The direction perpendicularly intersecting with the Z direction, parallel to the rotational axis direction (main scanning direction or longitudinal direction) of the photosensitive drum 1 is referred to as the X direction. The direction perpendicularly intersecting with the X and the Z directions is referred to as the Y direction. The X and the Y directions are parallel to the horizontal direction. For convenience, the positive side in the X direction is referred to as the right-hand side, and the negative side in the X direction is referred to as the left-hand side; the positive side in the Y direction is referred to as the front side, and the negative side in the Y direction is referred to as the rear side; and the positive side in the Z direction is referred to as the upper side, and the negative side in the Z direction is referred to as the lower side.

The image forming apparatus 100 forms an image on the recording medium (sheet) P. The image forming apparatus 100 according to the present exemplary embodiment is a monochromatic laser-beam printer employing the cleanerless method.

The image forming apparatus 100 includes an apparatus main body 100*a*. The apparatus main body 100*a* stores an image forming unit IM, an exposure device 3, a fixing unit 9, a two-sided printing guide (opposed member) 11, and a transfer guide (opening/closing member) 13. More specifically, the apparatus main body 100*a* includes a housing 100*c*, and the door 12 openable and closable relative to the housing 100*c*. The image forming unit IM, the exposure device 3, the fixing unit 9, the two-sided printing guide 11, and the transfer guide 13 are stored in the housing 100*c*. The apparatus main body 100*a* includes a control unit (controller) for performing an image forming operation based on image information received from an external apparatus.

The apparatus main body 100*a* includes a discharge portion 14 having a first opening 14*a* for discharging the recording medium P, and a wall 16*a* having a second opening 16 disposed on the opposite side to the discharge portion 14 in the horizontal direction. The wall 16*a* having the second opening 16 is a part of the door 12. The discharge portion 14 included in the housing 100*c* includes a discharging roller pair 14*b*.

The image forming unit IM includes a cylindrical electrophotographic photosensitive member (hereinafter referred to as a photosensitive drum) 1 as an image bearing member, a charging roller 2 as a charge member, and a development device 4 as a developing unit. The photosensitive drum 1 is rotatable around the rotational axis. The rotational axis direction of the photosensitive drum 1 is parallel to the X direction.

A first communication path CP1 communicating with the first opening 14*a* and the second opening 16 is formed in the apparatus main body 100*a*. The photosensitive drum 1 is stored in the apparatus main body 100*a* and disposed below the first opening 14*a*, the second opening 16, and the first communication path CP1 in the Z direction.

In addition to the charging roller 2 and the development device 4, the exposure device 3 as an exposure unit, a transfer roller 5 as a transfer unit, and a pre-exposure device 6 are disposed around the photosensitive drum 1. The exposure device 3, the transfer roller 5, and the pre-exposure device 6 can be referred to as a part of the image forming unit IM.

The control unit starts the image forming operation based on the image information from the external apparatus. When the image forming operation is started, the photosensitive drum 1 rotates in the direction of the arrow R1, as illustrated in FIG. 2A.

The surface of the photosensitive drum 1 is charged to a predetermined potential with a predetermined polarity (negative polarity in the present exemplary embodiment) by the charging roller 2 in contact with the photosensitive drum 1. The surface of the charged photosensitive drum 1 is exposed according to the image information by the exposure device 3. Thus, an electrostatic latent image corresponding to the image information is formed on the surface of the photosensitive drum 1. The electrostatic latent image is developed at the developing position by the development device 4 to be visualized as a toner image.

The charging roller 2 has an elastic layer made of a conductive elastic member, having a surface roughness Ra of 1.5 to 2.5 μm. The charging roller 2 comes into contact with the surface of the photosensitive drum 1 with a predetermined contact pressure. The position where the charging roller 2 and the photosensitive drum 1 come into contact with each other is referred to as a charging portion. The charging roller 2 is driven by a drive mechanism (not illustrated) so that the circumferential speed of the charging roller 2 becomes 105% of that of the photosensitive drum 1. The shaft of the charging roller 2 is applied with a predetermined direct-current (DC) voltage by a charging voltage power source. According to the present exemplary embodiment, the shaft of the charging roller 2 is applied with a −1,350 VDC voltage as a charging voltage. The surface of the photosensitive drum 1 charged by the charging roller 2 has a predetermined potential (dark portion potential) of −780 V.

The exposure device 3 as a laser scanner device irradiates the photosensitive drum 1 with a laser beam based on the image information to form an electrostatic latent image on the surface of the photosensitive drum 1. According to the present exemplary embodiment, portions on the surface of the photosensitive drum 1 exposed by the exposure device 3 have a predetermined potential (light portion potential) of −100 V. According to the present exemplary embodiment, the surface of the photosensitive drum 1 having the light portion potential is supplied with a toner from the development device 4, and the surface of the photosensitive drum 1 having the dark portion potential is not supplied with a toner from the development device 4.

The development device 4 includes a developing roller 41 as a developer bearing member, a toner supply roller 42 as a developer supply unit, a developer storage chamber 43 for storing a toner, and a development blade 44 as a layer regulation member. The development device 4 includes toner conveyance members for conveying the toner stored in the developer storage chamber 43 to the toner supply roller 42. The toner supplied from the developer storage chamber 43 is supplied to the developing roller 41 by the toner supply roller 42. The development blade 44 is in contact with the developing roller 41. When the developing roller 41 rotates, the toner supplied to the developing roller 41 passes through the contact portion between the development blade 44 and the developing roller 41. As a result, the toner carried by the developing roller 41 is charged to a predetermined polarity (normal charging property), and a toner layer with a predetermined thickness is formed on the surface of developing roller 41.

The toner used is a nonmagnetic one-component toner having a negative polarity manufactured with the suspension polymerization method. The toner has a volume mean particle diameter of 6.0 μm and a negative normal charging polarity.

The developing roller 41 comes into contact with the surface of the photosensitive drum 1 with a predetermined contact pressure. The portion where the developing roller 41 and the photosensitive drum 1 come into contact with each other is referred to as a developing portion. The developing roller 41 is driven by a drive mechanism (not illustrated) so that the circumferential speed of the developing roller 41 becomes 140% of that of the photosensitive drum 1. The shaft of the developing roller 41 is applied with a −380 VDC voltage by a developing voltage power source. In the image forming process, the toner born on the developing roller 41 is developed to the portions on the photosensitive drum 1 having the light portion potential by an electrostatic force generated by a potential difference between the −380 V developing voltage and the −100 V light portion potential of the photosensitive drum 1.

The region on the surface of the photosensitive drum 1 where a toner can be supplied from the developing roller 41 can be referred to as an image forming region on the photosensitive drum 1. The image forming region on the photosensitive drum 1 may be a region that can be exposed by the exposure device 3 or a region corresponding to a toner coat region on the surface of the developing roller 41 coated by the toner.

The transfer roller 5 facing the photosensitive drum 1 comes into contact with the surface of the photosensitive drum 1 with a predetermined contact pressure. Thus, a transfer portion is formed between the transfer roller 5 and the photosensitive drum 1. When the shaft of the transfer roller 5 is applied with a predetermined voltage by a transfer voltage power source at a predetermined timing, the toner image formed on the surface of the photosensitive drum 1 is transferred onto the recording medium P at the transfer portion.

The pre-exposure device 6 exposes the surface of the photosensitive drum 1 having passed the transfer portion but not having reached the charging portion. This resolves uneven surface potentials of the photosensitive drum 1. The toner not having been transferred onto the recording medium P and remaining on the photosensitive drum 1 passes through the charging portion and then is collected by the developing roller 41.

The image forming apparatus 100 includes a tray 10 and a sheet feeding unit 7 as recording medium storage units (sheet storage units) for storing sheets of the recording medium P at the lower portion. The sheet feeding unit 7 includes a pickup roller 7*a*, a feed roller 7*b*, and a separation roller 7*c*.

The pickup roller 7*a* rotates in contact with the top sheet of the recording medium P stacked on the tray 10 to send the top sheet of the recording medium P from the tray 10. The recording medium P sent out from the tray 10 is further conveyed with each sheet separated at a nip portion (separation nip) between the feed roller 7*b* and the separation roller 7*c*.

The apparatus main body 100*a* includes a conveyance unit 8 including a conveyance roller 8*a*, a first driven roller 8*b*, and a second driven roller 8*c*. The conveyance roller 8*a* is driven by a motor, and the first driven roller 8*b* and the second driven roller 8*c* are driven by the conveyance roller 8*a*. The recording medium P having passed through the separation nip is conveyed toward the transfer portion by the conveyance roller 8*a* and the first driven roller 8*b* in contact with the conveyance roller 8*a*.

The recording medium P stored in the tray 10 is conveyed to the transfer portion by the sheet feeding unit 7 and the conveyance roller 8 in synchronization with the timing when the toner image formed on the photosensitive drum 1 reaches the transfer portion. The toner image formed on the photosensitive drum 1 is transferred onto the recording medium P by the transfer roller 5 applied with a predetermined transfer voltage by the transfer voltage power source.

The fixing unit 9 configured to heat the recording medium P is disposed above the photosensitive drum 1. The fixing unit 9 includes a heating roller with a built-in heater, and a pressure roller biased toward the heating roller with a predetermined pressure. A conveyance path SP1 is formed downstream of the transfer portion and upstream of the fixing unit 9 in the conveyance direction of the recording medium P. After passing through the transfer portion, the recording medium P conveyed from the photosensitive drum 1 toward the fixing unit 9 passes through the conveyance path SP1.

A second communication path CP2 is formed above the photosensitive drum 1 and below the first communication path CP1. The second communication path CP2 communicates with the conveyance path SP1 and the first communication path CP1.

When the recording medium P conveyed to the fixing unit 9 is heated and pressurized by the fixing unit 9, the toner image transferred onto the recording medium P is fixed to the recording medium P.

The recording medium P with the toner image fixed thereto is discharged out of the apparatus main body 100*a* from the first opening 14*a*. The apparatus main body 100*a* is provided with a sheet discharge tray 15 for stacking sheets of the recording medium P. The recording medium P discharged from the first opening 14*a* is stacked on the sheet discharge tray 15.

When the recording medium P is heated, steam may be generated from the recording medium P. The steam generated from the recording medium P is discharged out of the apparatus main body 100*a* through the second opening (exhaust vent) 16. According to the present exemplary embodiment, the apparatus main body 100*a* (housing 100*c*) is provided with an upper opening 100*d* above the first communication path CP1. The upper opening 100*d* includes a plurality of holes, and steam is discharged out of the apparatus main body 100*a* through the upper opening 100*d*.

According to the present exemplary embodiment, the image forming apparatus 100 can perform one-sided printing for forming an image on one side of the recording medium P and two-sided printing for forming an image on both sides of the recording medium P.

When one-sided printing is performed, the recording medium P is conveyed in the P1 direction by the discharging roller pair 14*b* and then discharged onto the sheet discharge tray 15, as illustrated in FIG. 2A. When two-sided printing is performed, the recording medium P with a toner image fixed on one side is conveyed in the direction of the arrow P1 by the discharging roller pair 14*b*. Then, the rotational direction of the discharging roller pair 14*b* is reversed, and the recording medium P is conveyed in the P2 direction, as illustrated in FIG. 2B.

The recording medium P conveyed in the P2 direction passes through the two-sided conveyance path SP2 and then is conveyed to a nip portion between the first driven roller 8*b* and the conveyance roller 8*a* by the second driven roller 8*c* and the conveyance roller 8*a*. Then, the recording medium P with a toner image formed on the back surface at the transfer portion passes through the fixing unit 9 and then is discharged onto the sheet discharge tray 15.

According to the present exemplary embodiment, the first communication path CP1 is a part of the two-sided conveyance path SP2. The two-sided printing guide 11 and the transfer guide 13 function as guide members for guiding the recording medium P passing through the two-sided conveyance path P2.

The image forming operation on the recording medium P reduces the amount of toner in the development device 4. The image forming apparatus 100 according to the present exemplary embodiment can supply toner from a replenishment container TP attachable to and detachable from the image forming apparatus 100, to the development device 4. As illustrated in FIG. 1, the apparatus main body 100*a* of the image forming apparatus 100 is provided with a replenishment receiving member 100R. The replenishment container TP is detachably attached to the replenishment receiving member 100R. A toner is supplied from the replenishment container TP attached to the replenishment receiving member 100R to the development device 4 through a toner flow path (not illustrated).

According to the present exemplary embodiment, the sheet discharge tray 15 functions as a cover for openably and closably covering the replenishment receiving member 100R. The sheet discharge tray 15 is movable between a covering position for covering the replenishment receiving member 100R and a replenishing position for exposing the replenishment receiving member 100R. The sheet discharge tray 15 is rotatable to the housing 100*c* around a rotation center 15*a*. When the recording medium P discharged from the first opening 14*a* is stacked on the sheet discharge tray 15, the sheet discharge tray 15 is positioned at the covering position. When sheet discharge tray 15 moves from the covering position to the replenishing position, the sheet discharge tray 15 moves in the direction to approach the first opening 14*a*. When the sheet discharge tray 15 is at the replenishing position, the first opening 14*a* is covered by the sheet discharge tray 15 and therefore the discharge of the recording medium P from the first opening 14*a* and the image forming operation on the recording medium P are limited.

If the recording medium P jams, i.e., if a jam occurs in the image forming apparatus 100, the user performs what is called a jam clearance to take out the recording medium P from the image forming apparatus 100. Therefore, the door 12 and the transfer guide 13 of the image forming apparatus 100 according to the present exemplary embodiment are configured to be openable and closable. The door 12 is rotatable around a rotation center 121, and the transfer guide 13 is rotatable around a rotation center 131 (see FIG. 1). The rotation center 131 of the transfer guide 13 coincides with the rotation center of the conveyance roller 8*a*. The rotation center 131 of the transfer guide 13 is disposed below the photosensitive drum 1 with respect to the vertical direction.

The transfer guide 13 is an opening/closing member movable between a closed position for covering the photosensitive drum 1 and an open position for exposing the photosensitive drum 1. In a state where the transfer guide 13 is at the closed position, the upper end of the transfer guide 13 is positioned above the photosensitive drum 1 with respect to the vertical direction. When the transfer guide 13 supporting the transfer roller 5 is at the closed position, the transfer roller 5 is in contact with the photosensitive drum 1. When the transfer guide 13 is at the open position, the transfer roller 5 is separated from the photosensitive drum 1. The transfer guide 13 is biased from the open position toward the closed position by a spring (not illustrated). The transfer guide 13 may be opened and closed in association with the open/close operation of the door 12.

If the recording medium P jams between the conveyance unit 8 and the fixing unit 9, the user opens the door 12 and moves the transfer guide 13 to the open position, as illustrated in FIG. 3. In this state, the user can remove the recording medium P to perform a jam clearance. If the recording medium P jams in the two-sided conveyance path SP2, the user may open only the door 12 and perform a jam clearance.

After completion of the jam clearance, when the transfer guide 13 is moved to the closed position and the door 12 is closed, the image forming apparatus 100 becomes ready to restart the image forming operation.

<Invasion of Foreign substances Such as Dust>

Figure 4:
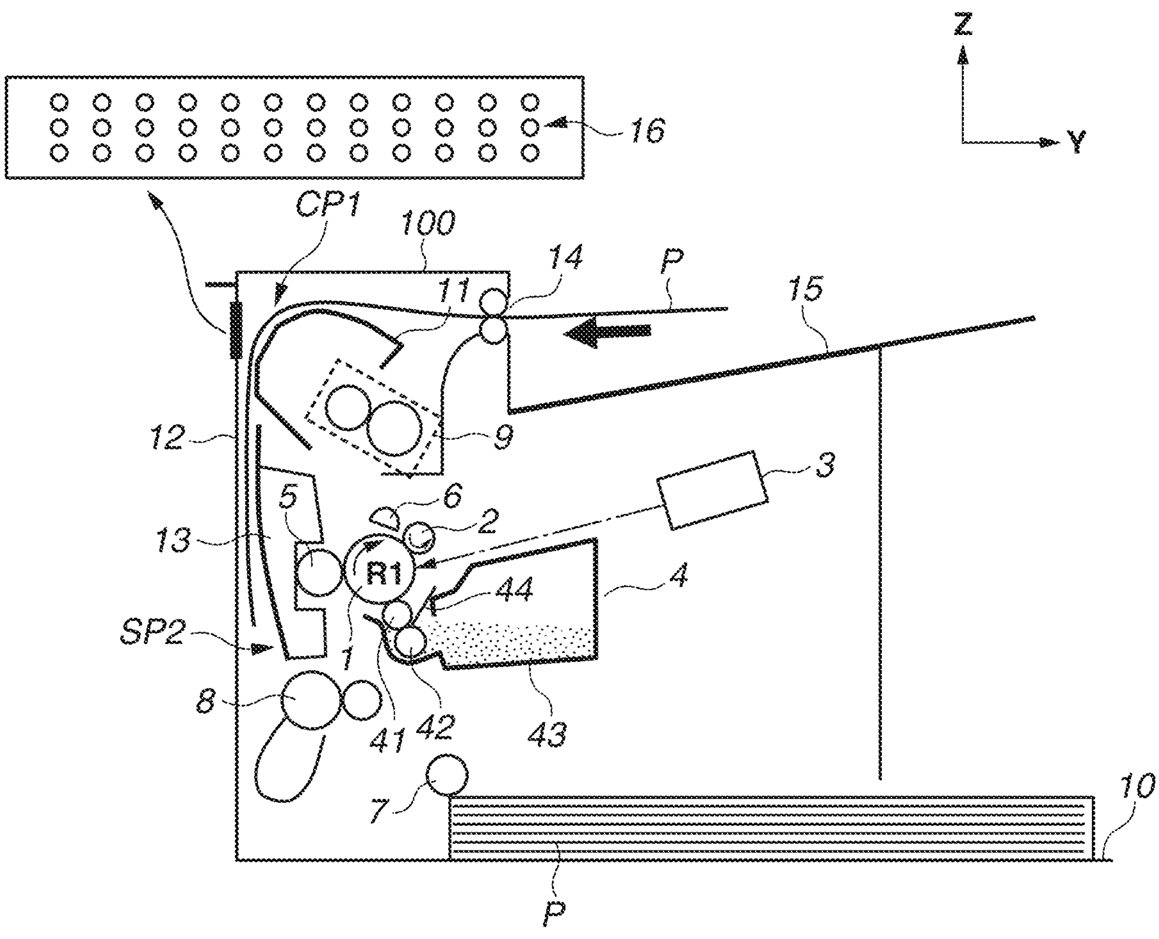
FIG. 4 is another schematic cross-sectional view illustrating the image forming apparatus.
Figure 5:
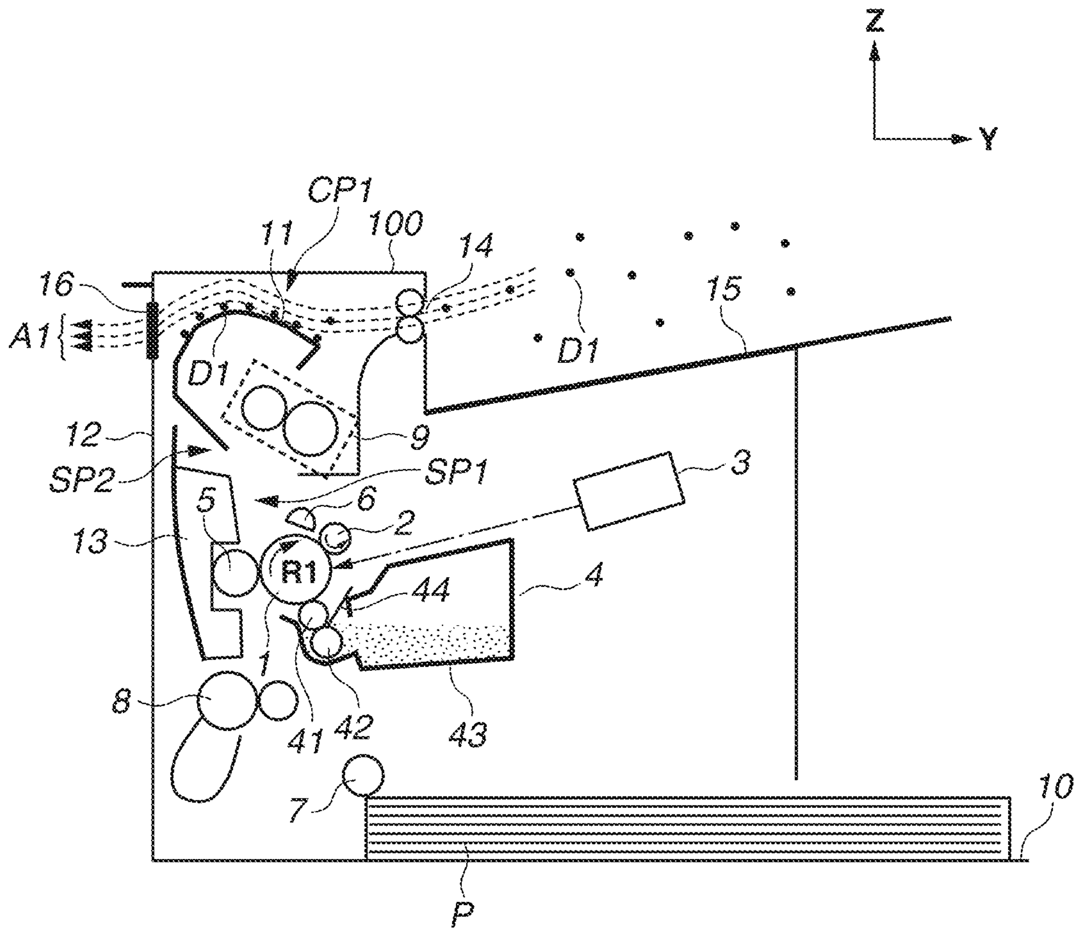
FIG. 5 is still another schematic cross-sectional view illustrating the image forming apparatus.
Figure 6:
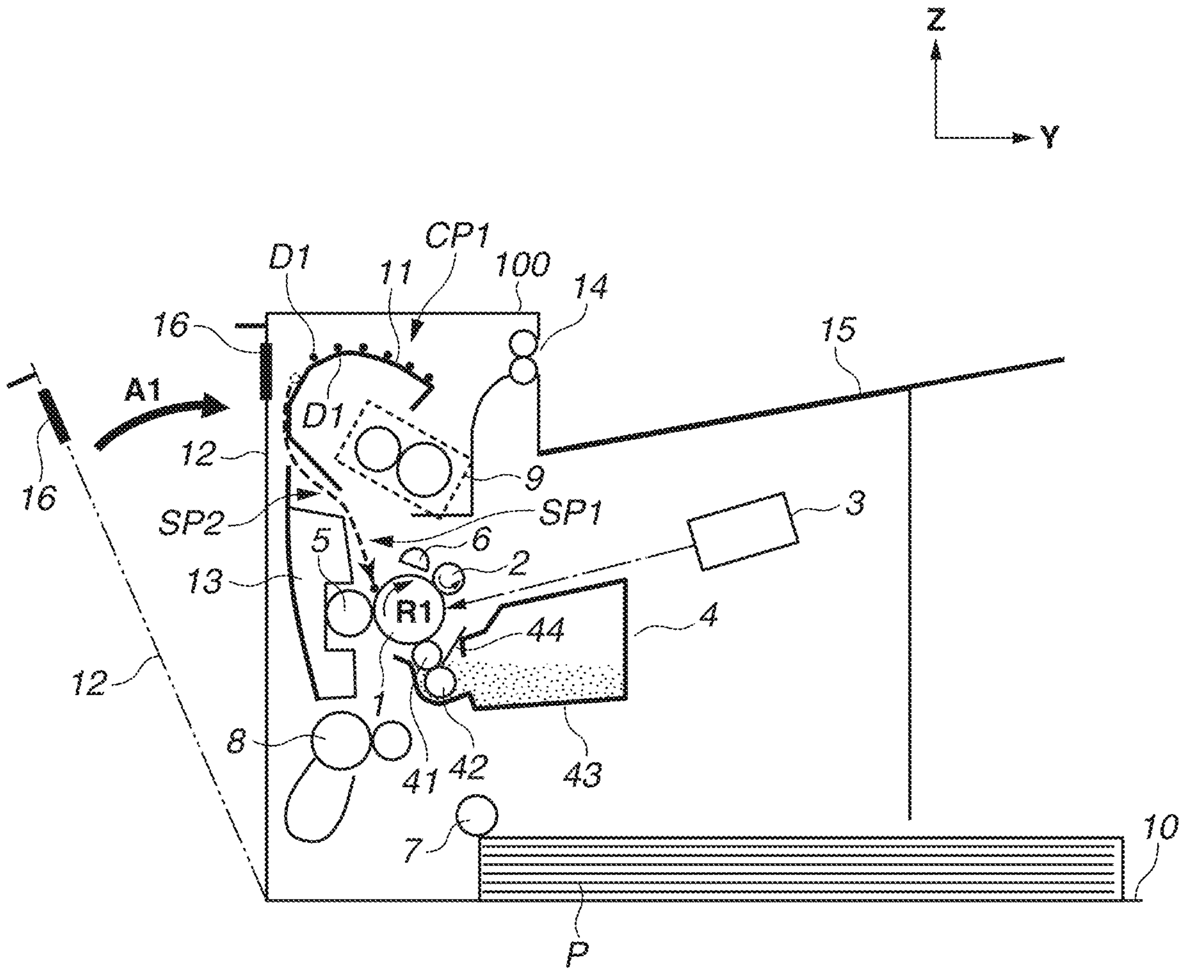
FIG. 6 is still another schematic cross-sectional view illustrating the image forming apparatus.

The invasion of foreign substances such as dust into the second opening 16 and the image forming apparatus 100 will be described below with reference to FIGS. 4, 5, and 6. FIGS. 4, 5, and 6 are schematic cross-sectional views illustrating the image forming apparatus 100.

As described above, the apparatus main body 100*a* includes the wall 16*a* having the second opening 16, disposed on the opposite side to the discharge portion 14 in the horizontal direction (see FIG. 1). The wall 16*a* is a part of the door 12. As illustrated in FIG. 4, the second opening 16 includes a plurality of holes and communicates between the inside of the apparatus main body 100*a* (the first communication path CP1 and the two-sided conveyance path SP2) and the outside of the apparatus main body 100*a*.

The second opening 16 is positioned above the photosensitive drum 1 and the fixing unit 9 (more specifically, the fixing nip) with respect to the vertical direction. The range where the image forming region on the photosensitive drum 1 exists overlaps with the range where the second opening 16 exists with respect to the rotational axis direction of the photosensitive drum 1.

The first communication path CP1 communicating with the first opening 14*a* and the second opening 16 serves as an air path. More specifically, air may flow from the first opening 14*a* to the second opening 16, as illustrated by the arrow A1 in FIG. 5. In the opposite direction to the arrow A1 in FIG. 5, air may also flow from the second opening 16 to the first opening 14*a*. These air flows may be produced by air conditioning and ventilation facilities in a room where the image forming apparatus 100 is installed.

The two-sided printing guide 11 is positioned below the first communication path CP1 with respect to the vertical direction and faces the first communication path CP1. When viewed in the rotational axis direction of the photosensitive drum 1, the two-sided printing guide 11 is disposed between the first opening 14*a* and the second opening 16 in the horizontal direction. The two-sided printing guide 11 is disposed above the photosensitive drum 1 with respect to the vertical direction. When viewed in the rotational axis direction of the photosensitive drum 1, the photosensitive drum 1 is disposed between the first opening 14*a* and the door 12, i.e., between the first opening 14*a* and the second opening 16 in the horizontal direction.

If a foreign substance D1 such as dust exists a lot in the air and the flow of air passing through the first communication path CP1 is strong, the foreign substance D1 such as dust may enter the image forming apparatus 100 together with the air passing through the first communication path CP1 and then accumulate on the two-sided printing guide 11. The foreign substance D1 in this case may include the foreign substance D1 entering the image forming apparatus 100 together with the air flowing in the direction of the arrow A1 in FIG. 5, and may include the foreign substance D1 entering the image forming apparatus 100 together with the air flowing in the opposite direction of the arrow A1.

For example, a vibration produced when the door 12 or the transfer guide 13 is closed may cause the foreign substance D1 accumulating on the two-sided printing guide 11 to drop on the negative side of the Z direction from the two-sided printing guide 11. According to the present exemplary embodiment, the transfer guide 13 is biased by a spring, and thus, the vibration generated when the transfer guide 13 is closed tends to be larger than the vibration generated when the door 12 is closed.

In the configuration where the photosensitive drum 1 is disposed below the two-sided printing guide 11, the foreign substance D1 may drop to the vicinity of the photosensitive drum 1.

According to the present exemplary embodiment, for example, in a state where the transfer guide 13 positioned below the two-sided printing guide 11 is at the closed position, the second communication path CP2 is formed between the transfer guide 13 and the two-sided printing guide 11, as illustrated in FIGS. 1 and 6. The second communication path CP2 communicates with the conveyance path SP1 and the first communication path CP1. As illustrated in FIG. 6, the foreign substance D1 may drop to the vicinity of the photosensitive drum 1 through the second communication path CP2.

The photosensitive drum 1 is exposed when the transfer guide 13 is at the open position. While the transfer guide 13 is being moved from the open position to the closed position, the foreign substance D1 may drop to the vicinity of the photosensitive drum 1.

Figure 7:
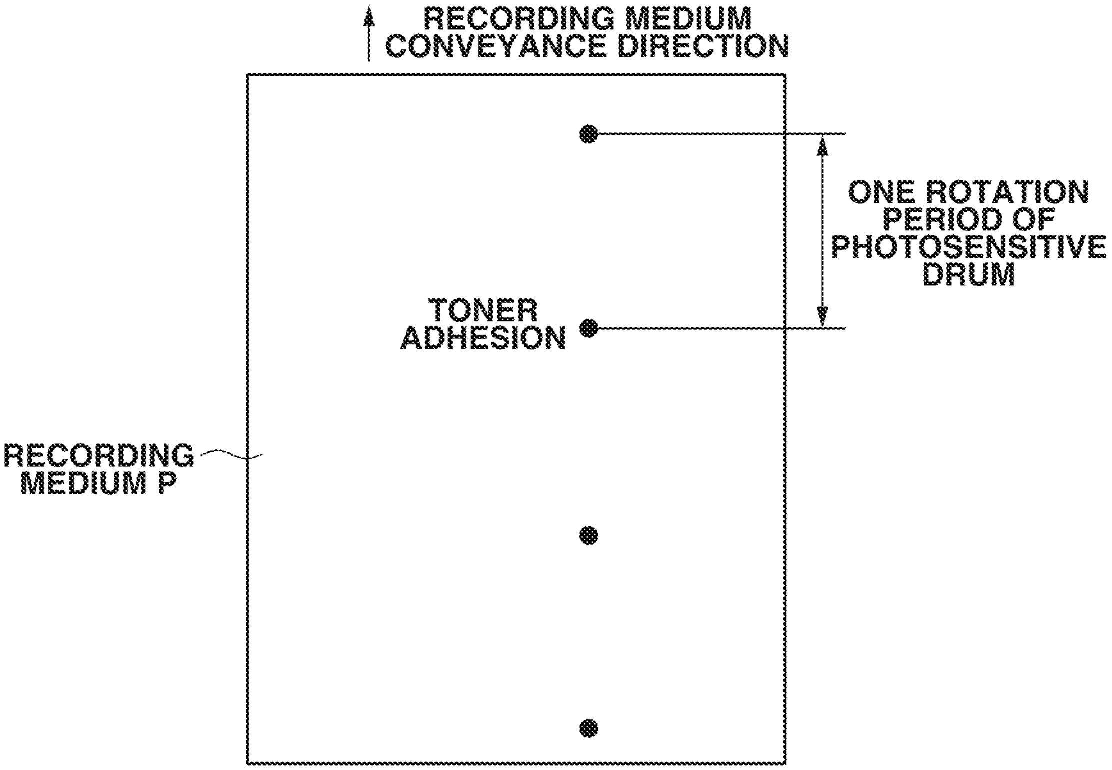
FIG. 7 illustrates a toner adhesion to a recording medium.

FIG. 7 illustrates toner adhesion to the recording medium P. For example, if the photosensitive drum 1 has a flaw with a predetermined depth or more, the charge retention capability of the surface of the photosensitive drum 1 decreases. As a result, a toner supplied from the developing roller 41 to the flawed portion (a portion on the surface of the photosensitive drum 1 where the charge retention capability decreases) may periodically adhere to the recording medium P. Referring to the example illustrated in FIG. 7, toner adhesion is repeated at one rotation period of the photosensitive drum 1.

It has been necessary to replace the photosensitive drum 1 if the image forming apparatus 100 is used in an environment where the foreign substance D1 such as dust exists a lot in the air, the flow air passing through the first communication path CP1 is strong, and toner adhesion is caused by the foreign substance D1 adhering to the photosensitive drum 1, as described above.

<Configuration for Preventing Foreign Substance Adhesion to Photosensitive Drum>

Figure 8B:
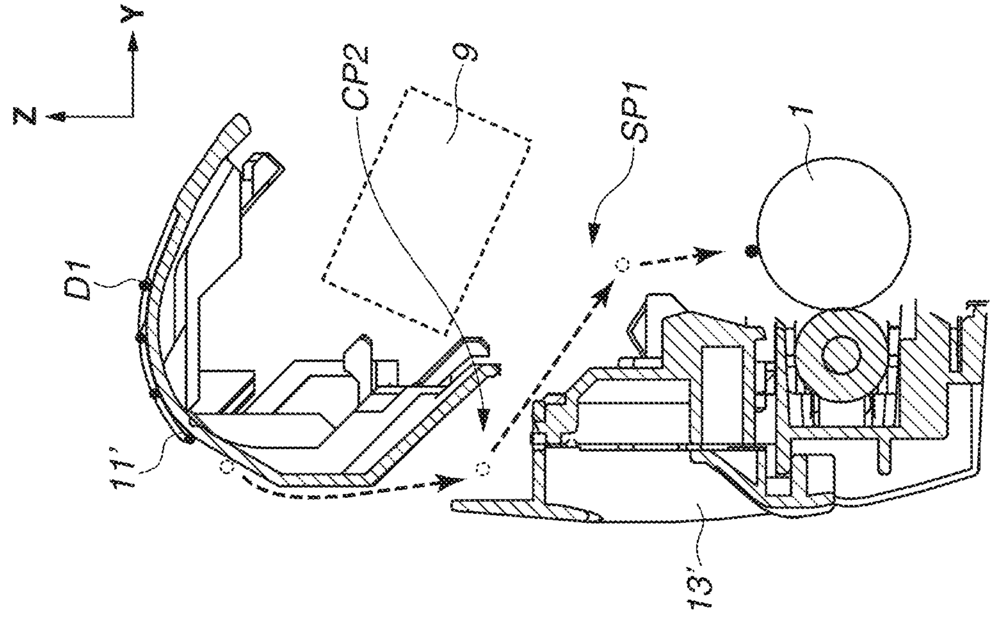
FIGS. 8A and 8B are cross-sectional views illustrating a two-sided printing guide and a transfer guide according to a comparative example.
Figure 8A:
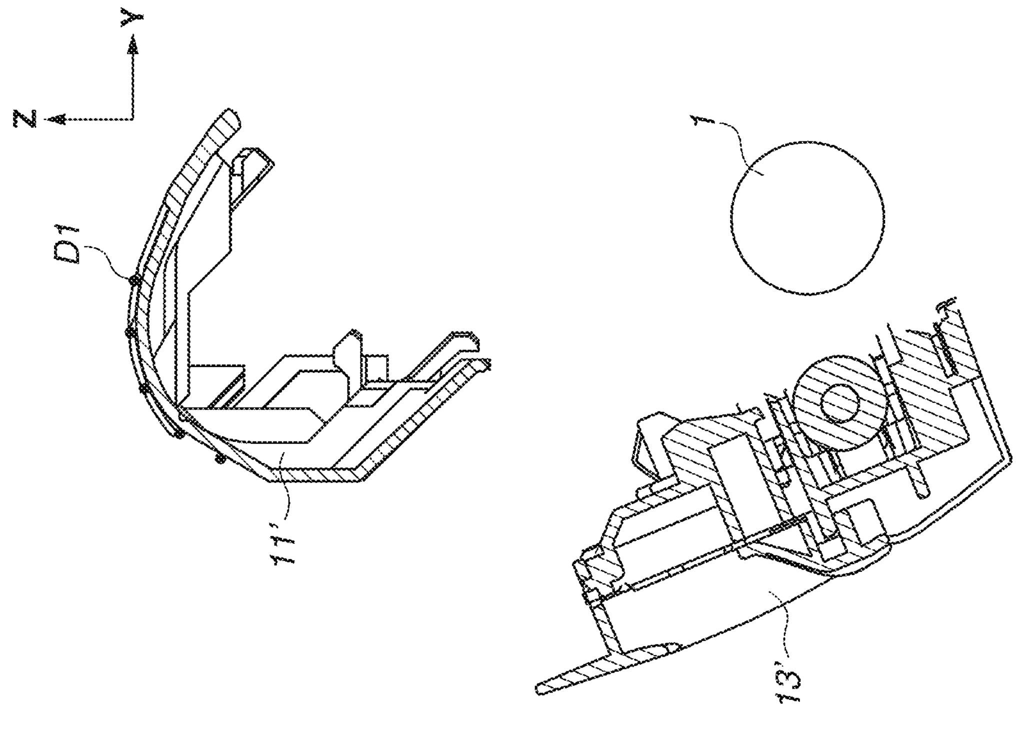

FIGS. 8A and 8B are cross-sectional views illustrating a two-sided printing guide 11' and a transfer guide 13' according to a comparative example. Referring to FIG. 8A, the transfer guide 13' is positioned at the open position. Referring to FIG. 8B, the transfer guide 13' is positioned at the closed position. According to the comparative example, since the two-sided printing guide 11' has no portion for preventing the foreign substance D1 from dropping, the foreign substance D1 accumulating on the two-sided printing guide 11' drops to the vicinity of the photosensitive drum 1.

A configuration for preventing the adhesion of the foreign substance D1 to the photosensitive drum 1 will be described below with reference to FIGS. 9A, 9B, 10A, 10B, 11A, 11B, 12A, and 12B.

Figure 9A:
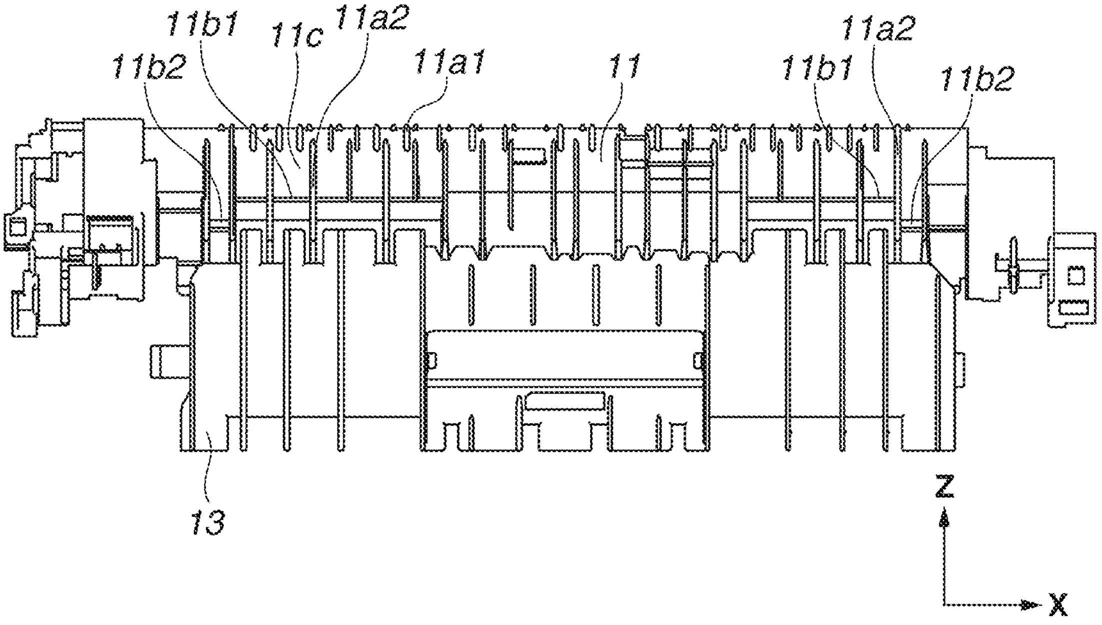
FIGS. 9A and 9B illustrate a two-sided printing guide and a transfer guide according to a present exemplary embodiment.
Figure 9B:
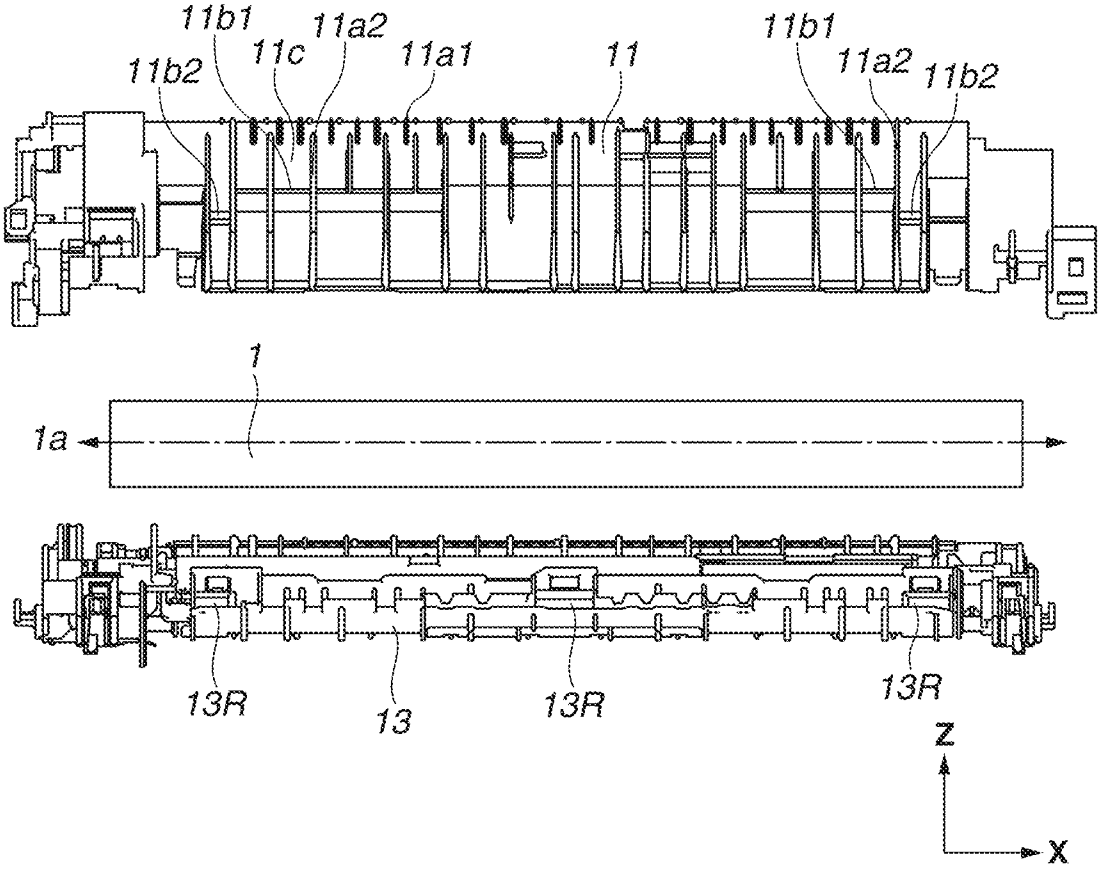

FIGS. 9A and 9B illustrate the two-sided printing guide 11 and the transfer guide 13 according to the present exemplary embodiment. FIG. 9A illustrates a state where the transfer guide 13 is at the closed position, and FIG. 9B illustrates a state where the transfer guide 13 is at the open position. FIGS. 9A and 9B are drawings when the image forming apparatus 100 is viewed in the Y direction. The arrow 1*a* in FIG. 9B indicates the rotational axis direction of the photosensitive drum 1.

Figure 10A:
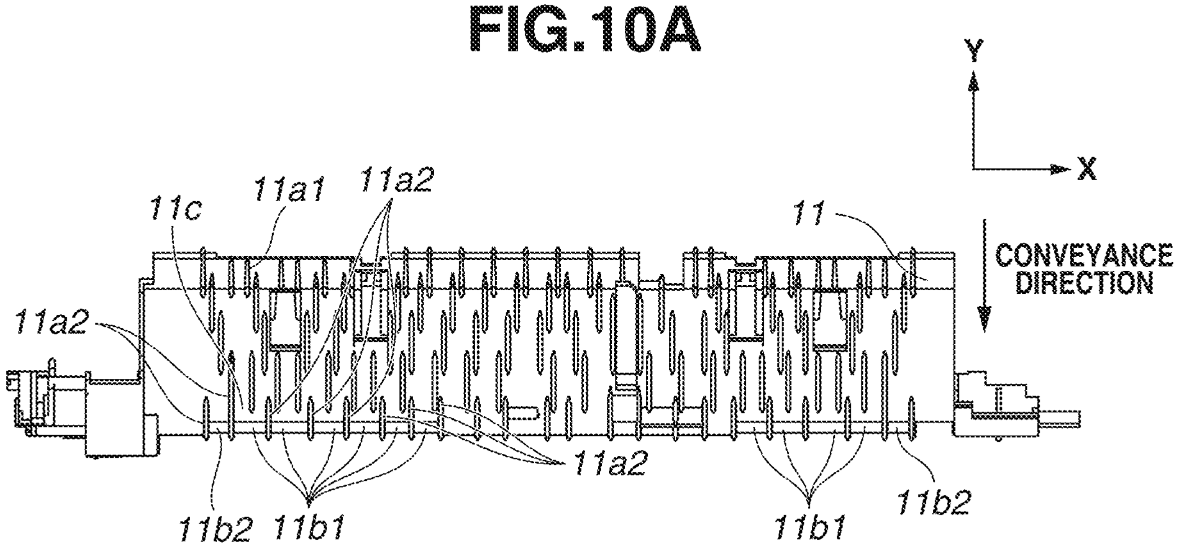
FIGS. 10A and 10B illustrate the two-sided printing guide according to the present exemplary embodiment.
Figure 10B:
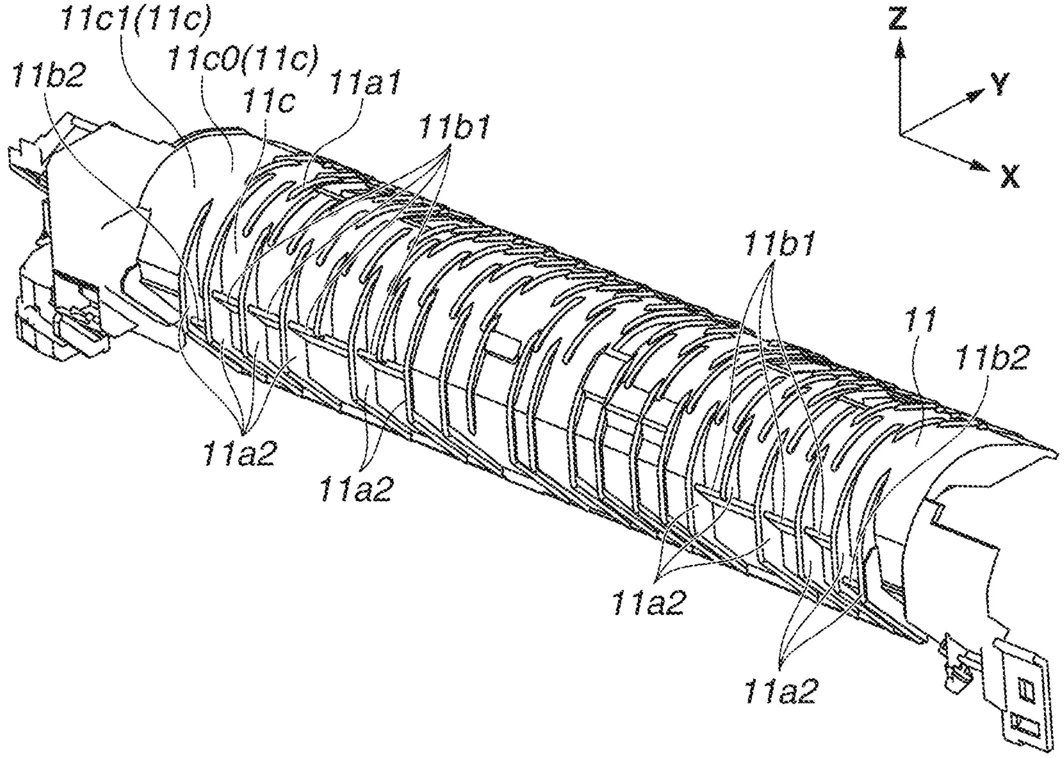

FIGS. 10A and 10B illustrate the two-sided printing guide 11 according to the present exemplary embodiment. FIG. 10A illustrates the two-sided printing guide 11 viewed in the vertical direction, more specifically, the opposite direction to the Z direction. FIG. 10B is a perspective view illustrating the two-sided printing guide 11.

FIGS. 11A, 11B, 12A, and 12B are cross-sectional views illustrating the two-sided printing guide 11 and the transfer guide 13 according to the present exemplary embodiment. FIGS. 11A, 11B, 12A, and 12B are cross-sectional views illustrating the two-sided printing guide 11 and the transfer guide 13 according to the present exemplary embodiment taken along a direction perpendicularly intersecting with the rotational axis direction of the photosensitive drum 1, when viewed in the rotational axis of the photosensitive drum 1.

The two-sided printing guide 11 according to the present exemplary embodiment includes receiving ribs (receiving projections) 11*b*1 and 11*b*2.

The receiving ribs 11*b*1 and 11*b*2 catch the foreign substance D1 to prevent it from adhering to the photosensitive drum 1. The shape of the two-sided printing guide 11 will be described in more detail below.

The two-sided printing guide 11 stored in the apparatus main body 100A includes an exposed surface 11*c* exposed toward the first communication path CP1. The exposed surface 11*c* is disposed below the first communication path CP1. A state where the exposed surface 11*c* is exposed toward the first communication path CP1 means that the exposed surface 11*c* is visible from any position in the first communication path CP1. The exposed surface 11*c* can be said to be an opposed surface facing the first communication path CP1.

Figure 11A:
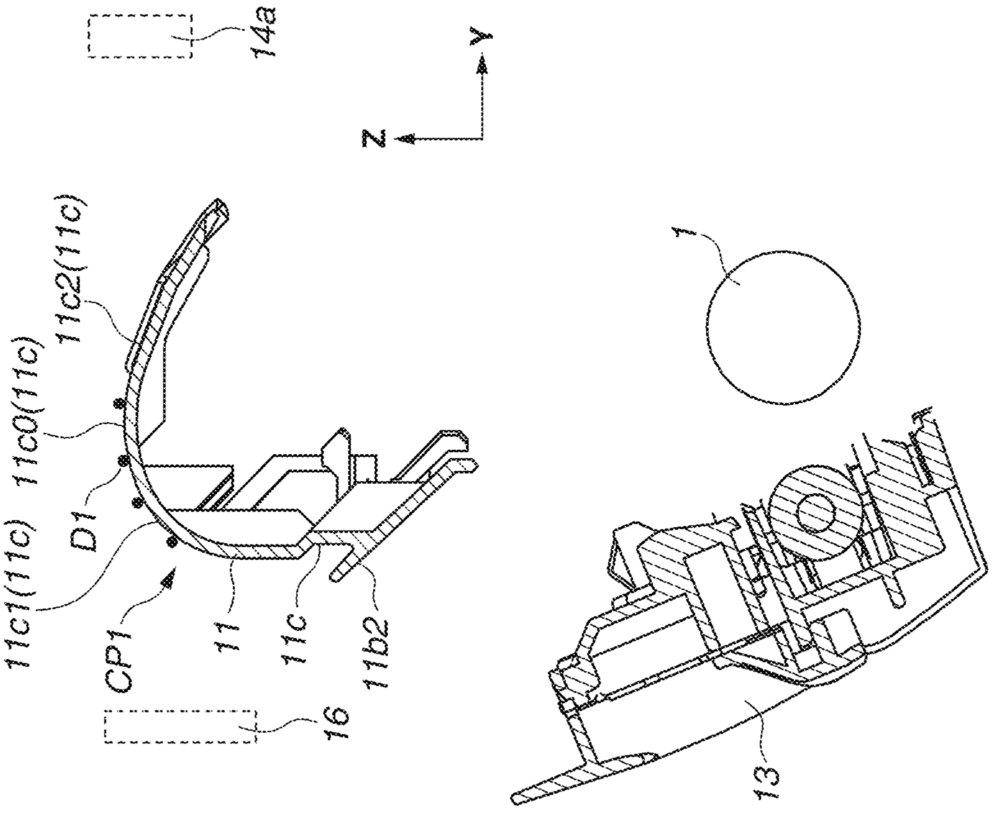
FIGS. 11A and 11B are cross-sectional views illustrating the two-sided printing guide and the transfer guide according to the present exemplary embodiment.
Figure 11B:
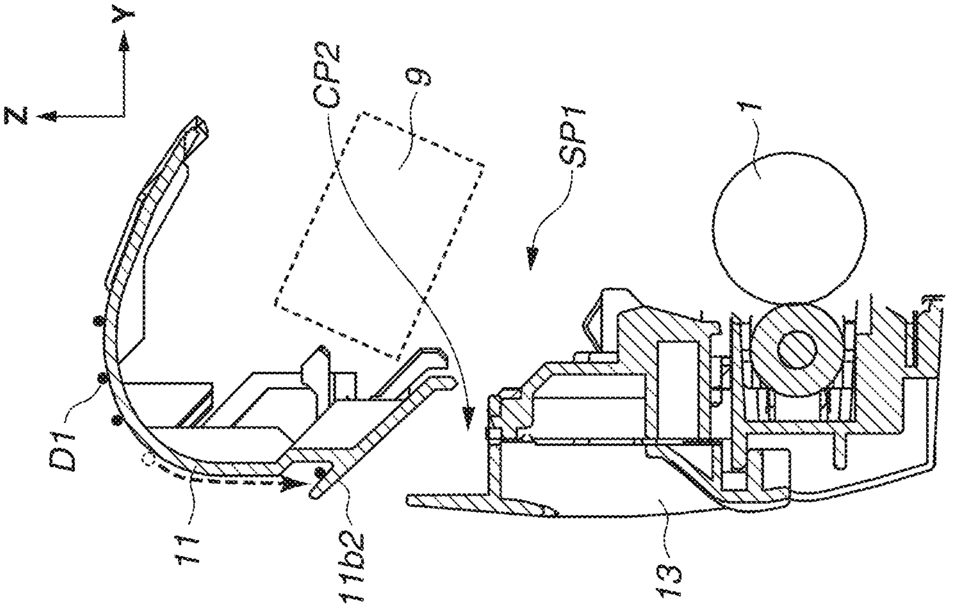

As illustrated in FIGS. 10B and 11A, the exposed surface 11*c* has a curved surface upwardly curved with respect to the vertical direction. The curved surface of the exposed surface 11*c* includes an apex 11*c*0 at the highest position with respect to the vertical direction, a first surface 11*c*1, and a second surface 11*c*2. As illustrated in FIG. 11A, when viewed in the rotational axis direction of the photosensitive drum 1, the first surface 11*c*1 is positioned on one side of the apex 11*c*0, and the second surface 11*c*2 is positioned on the other side of the apex 11*c*0.

When viewed in the rotational axis direction of the photosensitive drum 1, the apex 11*c*0 is positioned between the first opening 14*a* and the second opening 16 in the horizontal direction. As understood from FIG. 1, when viewed in the rotational axis direction of the photosensitive drum 1, the apex 11*c*0 is closer to the second opening 16 than to the first opening 14*a*. More specifically, the distance between the apex 11*c*0 and the second opening 16 is shorter than the distance between the apex 11*c*0 and the first opening 14*a* in the horizontal direction.

When viewed in the rotational axis direction of the photosensitive drum 1, the first surface 11*c*1 is closer to the second opening 16 than the apex 11*c*0 is in the horizontal direction. More specifically, the distance between the first surface 11*c*1 and the second opening 16 is shorter than the distance between the apex 11*c*0 and the second opening 16 in the horizontal direction. When viewed in the rotational axis direction of the photosensitive drum 1, the second surface 11*c*2 is closer to the first opening 14*a* than the apex 11*c*0 is in the horizontal direction. More specifically, the distance between the second surface 11*c*2 and the first opening 14*a* is shorter than the distance between the apex 11*c*0 and the first opening 14*a* in the horizontal direction.

The first surface 11*c*1 and the second surface 11*c*2 are downwardly inclined from the apex 11*c*0. In other words, the first surface 11*c*1 and the second surface 11*c*2 downwardly extend in the vertical direction as separating from the apex 11*c*0 in the horizontal direction. According to the present exemplary embodiment, the first surface 11*c*1 and the second surface 11*c*2 each include a curved portion.

As illustrated in FIGS. 10A and 10B, the two-sided printing guide 11 has a plurality of first ribs 11*a*1 and a plurality of second ribs 11*a*2. The plurality of first ribs 11*a*1 and the plurality of second ribs 11*a*2 project from the exposed surface 11*c* toward the first communication path CP1. The plurality of first ribs 11*a*1 is disposed to be discrete with each other and arranged along the rotational axis direction of the photosensitive drum 1. The plurality of second rib 11*a*2 is arranged along the rotational axis direction of the photosensitive drum 1.

Each of the plurality of first rib 11*a*1 and each of the plurality of second rib 11*a*2 extend in a direction intersecting with the rotational axis direction of the photosensitive drum 1. According to the present exemplary embodiment, the first communication path CP1 functions as a conveyance path where the recording medium P is passable. More specifically, the first communication path CP1 is a part of the two-sided conveyance path SP2. The plurality of first ribs 11*a*1 and the plurality of second ribs 11*a*2 extend along the conveyance direction of the recording medium P passing through the first communication path CP1, and have a function of guiding the recording medium P passing through the first communication path CP1.

As illustrated in FIG. 10B, the back side of the two-sided printing guide 11 is provided with the receiving ribs 11*b*1 and 11*b*2 projecting from the exposed surface 11*c* of the two-sided printing guide 11. For each of the receiving ribs 11*b*1 and 11*b*2, the top face (upwardly oriented surface with respect to the vertical direction) functions as a receiving surface for receiving the foreign substance D1. In other words, the two-sided printing guide 11 has a plurality of receiving members which are the top faces of the receiving ribs 11*b*1 and 11*b*2.

According to the present exemplary embodiment, the two-sided printing guide 11 has the plurality of receiving ribs 11*b*1 and the plurality of receiving ribs 11*b*2. The shapes of the plurality of receiving ribs 11*b*1 are substantially the same, and the shapes of the plurality of receiving ribs 11*b*2 are also substantially the same. One or a plurality of receiving ribs 11*b*1 and one or a plurality of receiving ribs 11*b*2 may be provided. The two-sided printing guide 11 may have either one of the ribs 11*b*1 and 11*b*2.

The top faces of the receiving ribs 11*b*1 and 11*b*2 project from the exposed surface 11*c* toward the first communication path CP1 and face the first communication path CP1. At least a part of the top faces of the receiving ribs 11*b*1 and 11*b*2 are positioned immediately below the first communication path CP1. Therefore, the top faces of the receiving ribs 11*b*1 and 11*b*2 can receive the foreign substance D1 downwardly dropping from the first communication path CP1.

The top faces of the receiving ribs 11*b*1 and 11*b*2 extend along the rotational axis direction of the photosensitive drum 1 to connect with the plurality of second ribs 11*a*2. This prevents the foreign substance D1 from dropping from the top faces of the receiving ribs 11*b*1 and 11*b*2.

The top faces of the receiving ribs 11*b*1 and 11*b*2 are positioned above the photosensitive drum 1 with respect to the vertical direction. The top faces of the receiving ribs 11*b*1 and 11*b*2 are positioned above the second communication path CP2 with respect to the vertical direction.

As understood from FIG. 9B, the positions of the top faces of the receiving ribs 11*b*1 and 11*b*2 overlap with the position of the photosensitive drum 1 with respect to the rotational axis direction of the photosensitive drum 1. Preferably, the length of the plurality of receiving members (the total length of the top faces of the receiving ribs 11*b*1 and 11*b*2) is 50% or more of the length of the image forming region on the photosensitive drum 1 with respect to the rotational axis direction of the photosensitive drum 1.

Although, according to the present exemplary embodiment, the receiving ribs 11*b*1 and 11*b*2 are disposed at other than the longitudinal central part of the two-sided printing guide 11, these may be provided in a region including the longitudinal central part. Even if the receiving ribs 11*b*1 and 11*b*2 are disposed not to connect with the second ribs 11*a*2, the foreign substance D1 can be prevented from dropping.

The top faces of the receiving ribs 11*b*1 and 11*b*2, the exposed surface 11*c*, and the plurality of second ribs 11*a*2 form spaces for storing the foreign substance D1, thus preventing the foreign substance D1 from dropping and adhering to the photosensitive drum 1.

Figure 12B:
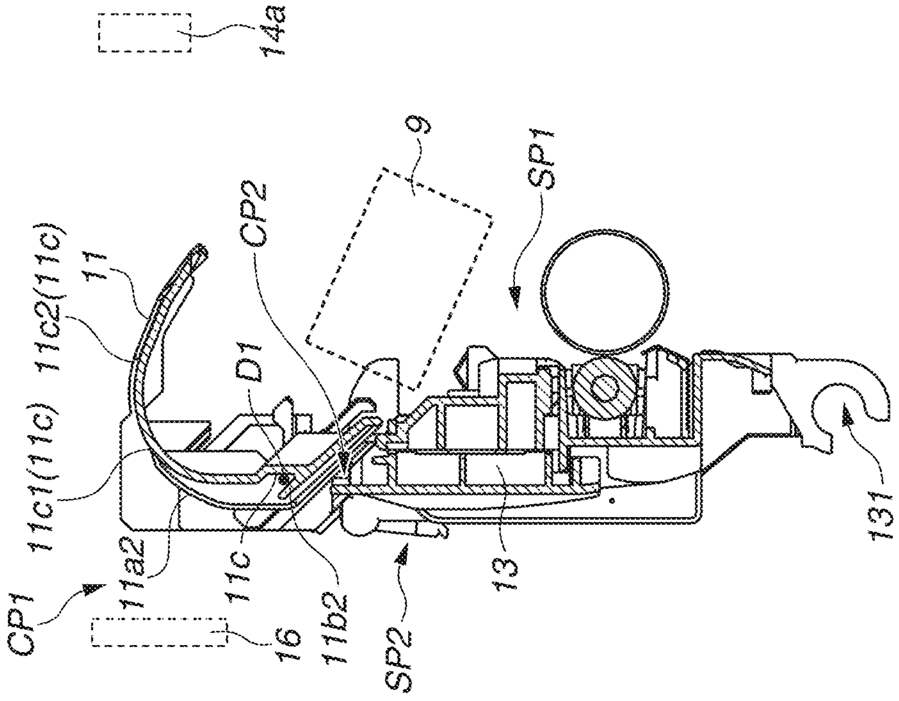
FIGS. 12A and 12B are other cross-sectional views illustrating the two-sided printing guide and the transfer guide according to the present exemplary embodiment.
Figure 12A:
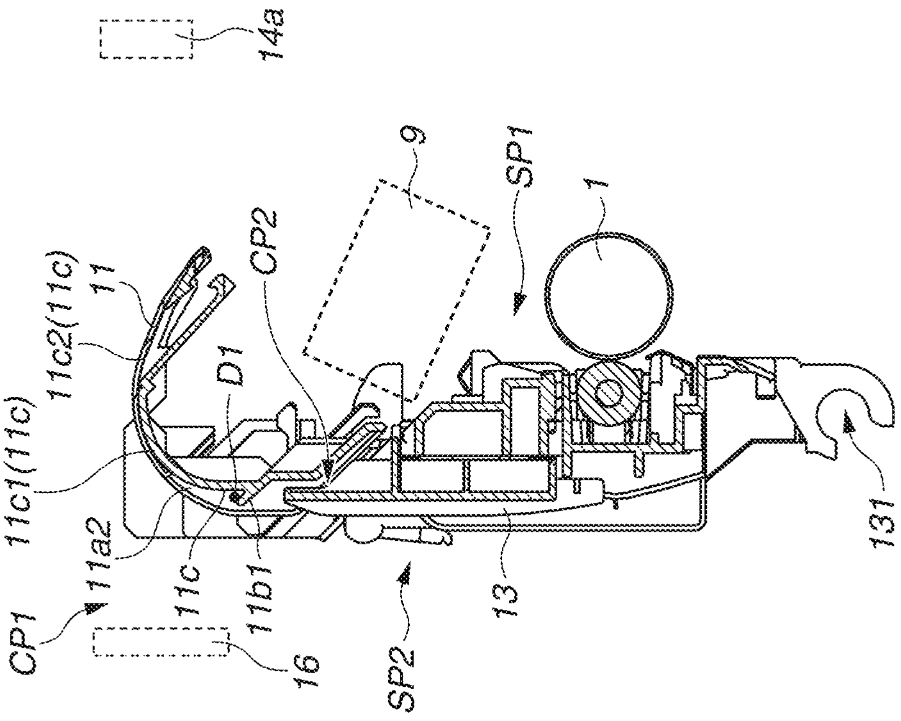

As illustrated in FIGS. 12A and 12B, when viewed in the rotational axis direction of the photosensitive drum 1, the top faces of the receiving ribs 11*b*1 and 11*b*2 are closer to the second opening 16 than to the first opening 14*a*. More specifically, the distance between each of the top faces of the receiving ribs 11*b*1 and 11*b*2 and the second opening 16 is shorter than the distance between each of the top faces of the receiving ribs 11*b*1 and 11*b*2 and the first opening 14*a*. The top faces of the receiving ribs 11*b*1 and 11*b*2 project from the exposed surface 11*c* toward the second opening 16.

Although the top faces of the receiving ribs 11*b*1 and 11*b*2 may horizontally extend, preferably, the top faces upwardly extend in a direction intersecting with the horizontal and vertical directions. More specifically, the top faces of the receiving ribs 11*b*1 and 11*b*2 are preferably inclined relative to the vertical direction and the horizontal direction so that the leading ends of the top faces are positioned above the roots connecting with the exposed surface 11*c*.

When viewed in the rotational axis direction of the photosensitive drum 1, the first surface 11*c*1 of the exposed surface 11*c* is positioned between the apex 11*c*0 and the leading ends of the top faces of the receiving ribs 11*b*1 and 11*b*2 in the horizontal direction. Thus, the foreign substance D1 dropping from the first surface 11*c*1 is received by the top faces of the receiving ribs 11*b*1 and 11*b*2.

If the foreign substance D1 adheres to the photosensitive drum 1, the foreign substance D1 which may cause the toner adhesion illustrated in FIG. 7 tends to have a size of several tens to several hundreds of micrometers (μm). Therefore, preferably, the projections of the top faces of the receiving ribs 11*b*1 and 11*b*2 from the exposed surface 11*c* have a length of 1 mm or more (hereinafter this length is simply referred to as a projection length). If the opening/closing operation of the transfer guide 13 causes a strong shock, the longer projection length is more preferable in order to prevent the foreign substance D1 from dropping from the top faces of the receiving ribs 11*b*1 and 11*b*2.

According to the present exemplary embodiment, on the other hand, the second rib 11*a*2 functions as a guide rib for guiding the recording medium P. The receiving ribs 11*b*1 and 11*b*2 extend in the opposite direction of the conveyance direction of the recording medium P from the exposed surface 11*c*. The projecting height is made shorter than the projection length of the second rib 11*a*2 projecting from the exposed surface 11*c*. This prevents the top faces of the receiving ribs 11*b*1 and 11*b*2 from coming into contact with the recording medium P.

As illustrated in FIGS. 12A and 12B, the leading ends of the top faces of the receiving ribs 11*b*1 and 11*b*2 project in the −Y direction more than the back surface of the transfer guide 13. The leading ends of the top faces of the receiving ribs 11*b*1 and 11*b*2 project in the −Y direction more than the end of the second communication path CP2 formed by the two-sided printing guide 11 and the transfer guide 13.

Thus, even if the foreign substance D1 drops from the top faces of the receiving ribs 11*b*1 and 11*b*2, the foreign substance D1 is prevented from entering the second communication path CP2 and therefore becomes hard to drop to the vicinity of the photosensitive drum 1. The transfer guide 13 is provided with guide ribs for guiding the recording medium P passing through the two-sided conveyance path SP2. The back surface of the transfer guide 13 refers to the surface between the guide ribs of the transfer guide 13.

FIGS. 8A and 8B illustrate a case where the receiving rib 11*b*2 is not provided. In this case, if the foreign substance D1 on the two-sided printing guide 11 drops by a vibration occurring when the transfer guide 13 is closed, the foreign substance D is likely to enter the gap between the two-sided printing guide 11 and the transfer guide 13 and drop to the photosensitive drum 1. If the receiving ribs 11*b*1 and 11*b*2 are provided, on the other hand, the top faces of the receiving ribs 11*b*1 and 11*b*2 block the gap between the two-sided printing guide 11 and the transfer guide 13 when viewed from the positive side in the Z direction. The top faces of the receiving ribs 11*b*1 and 11*b*2 receive the foreign substance D1 to prevent the foreign substance D1 from dropping to the photosensitive drum 1.

An effect of the two-sided printing guide 11 according to the present exemplary embodiment will be described below. We compared the adhesion of the foreign substance D1 to the photosensitive drum 1 between a configuration including the two-sided printing guide 11' according to the comparative example illustrated in FIGS. 8A and 8B and a configuration including the two-sided printing guide 11 according to the present exemplary embodiment. More specifically, 0.5 g of mineral powder simulating dust was uniformly sprayed on the two-sided printing guides 11 and 11' in the longitudinal direction. The mineral powder includes silica with a particle diameter of several tens to several hundreds of microns. Then, we performed the opening/closing operation of the transfer guide 13 five times, and counted the number of mineral powder particles adhering to the photosensitive drum 1. Evaluation was performed three times for each of the two-sided printing guide 11 according to the present exemplary embodiment and that according to the comparative example.

Table 1 illustrates evaluation results of a configuration A including the two-sided printing guide 11 according to the present exemplary embodiment and the comparative example including the two-sided printing guide 11'.

TABLE 1

| | First evaluation | Second evaluation | Third evaluation |
|---|---|---|---|
| Comparative example | 60 | 72 | 55 |
| Configuration A | 30 | 34 | 28 |

Referring to Table 1, the two-sided printing guide 11 according to the present exemplary embodiment reduces the number of mineral powder particles to about a half of the number according to the comparative example, and provides an effect of preventing the foreign substance D1 on the two-sided printing guide 11 from adhering to the photosensitive drum 1.

According to the present exemplary embodiment, the receiving ribs 11*b*1 and 11*b*2, the exposed surface 11*c*, and the second rib 11*a*2 are integrally disposed on the two-sided printing guide 11. However, the receiving ribs 11*b*1 and 11*b*2, the exposed surface 11*c*, and the second rib 11*a*2 may be divided into a plurality of parts.

(Transfer Guide)

In addition to the receiving ribs 11*b*1 and 11*b*2 disposed on the two-sided printing guide 11, a transfer receiving member 13R (described below) may be disposed on the transfer guide 13. The transfer guide 13 having the transfer receiving member 13R enables preventing the foreign substance D1 dropping from the two-sided printing guide 11 from adhering to the photosensitive drum 1.

A configuration of the transfer guide 13 according to the present exemplary embodiment will be described below with reference to FIGS. 13A to 16.

Figure 13A:
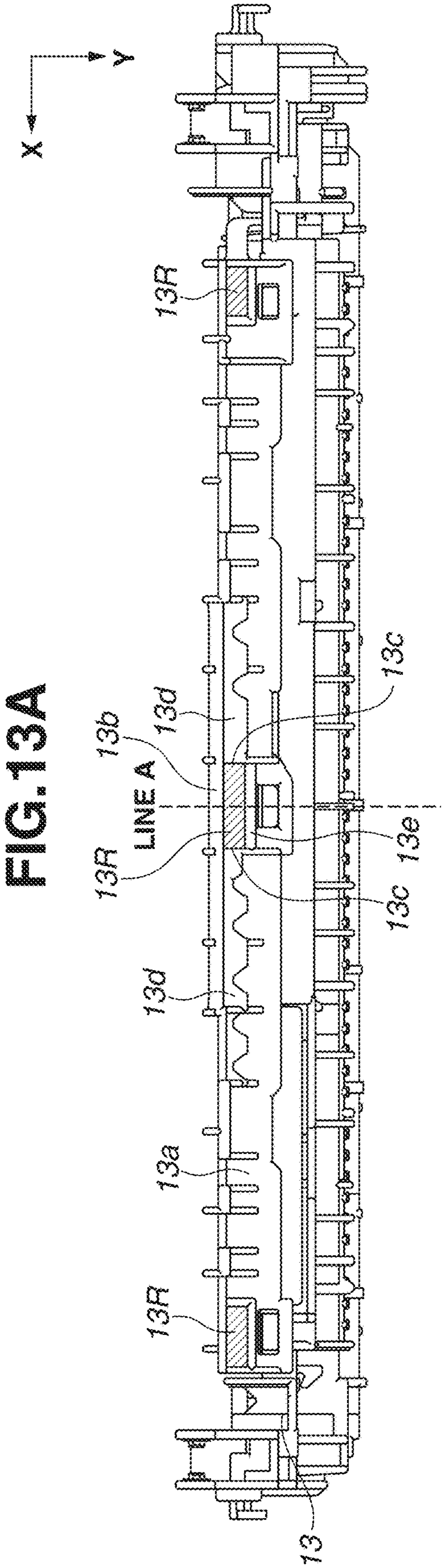
FIGS. 13A and 13B illustrate the transfer guide according to the present exemplary embodiment.
Figure 13B:
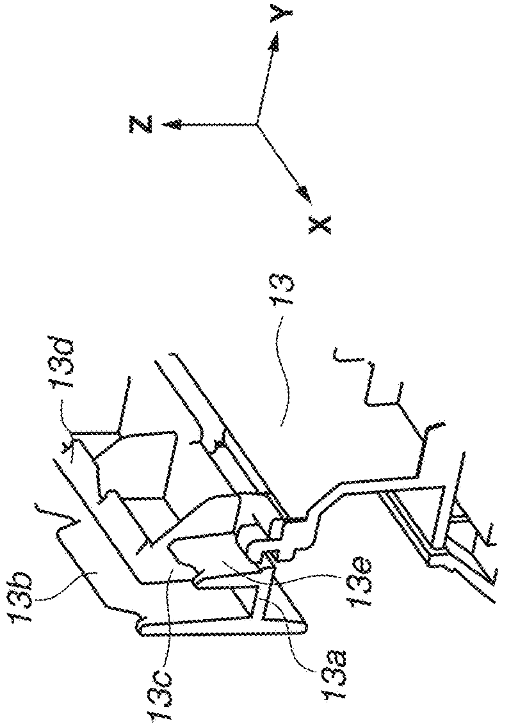

FIGS. 13A and 13B illustrate the transfer guide 13 according to the present exemplary embodiment. FIG. 13B is a cross-sectional view illustrating the transfer guide 13 taken along the line A of FIG. 13A.

FIGS. 14A, 14B, 15A, 15B, and 16 are cross-sectional views illustrating the transfer guide 13 and the two-sided printing guide 11 according to the present exemplary embodiment. FIGS. 14A, 14B, 15A, 15B, and 16 are cross-sectional views illustrating the two-sided printing guide 11 and the transfer guide 13 according to the present exemplary embodiment taken along a direction perpendicularly intersecting with the rotational axis direction of the photosensitive drum 1 when viewed in the rotational axis of the photosensitive drum 1.

According to the present exemplary embodiment, the transfer guide 13 includes a plurality of transfer receiving members 13R. The shapes of the plurality of transfer receiving members 13R are substantially the same.

As illustrated in FIGS. 13A and 13B, the transfer guide 13 includes a bottom wall 13*a*, a first side wall 13*b*, and a second side wall 13*e* facing the first side wall 13*b*. The first side wall 13*b* and the second side wall 13*e* extend along the rotational axis direction of the photosensitive drum 1 and connect with the bottom wall 13*a*.

The transfer guide 13 further includes a plurality of side walls 13*c*. Each of the plurality of side walls 13*c* extends along a direction intersecting with the rotational axis direction of the photosensitive drum 1 and connects with the bottom wall 13*a*, the first side wall 13*b*, and the second side wall 13*e*. The plurality of side walls 13*c* face each other. One of the plurality of side walls 13*c* is referred to as a third side wall, and the other is referred to as a fourth side wall.

Figure 14B:
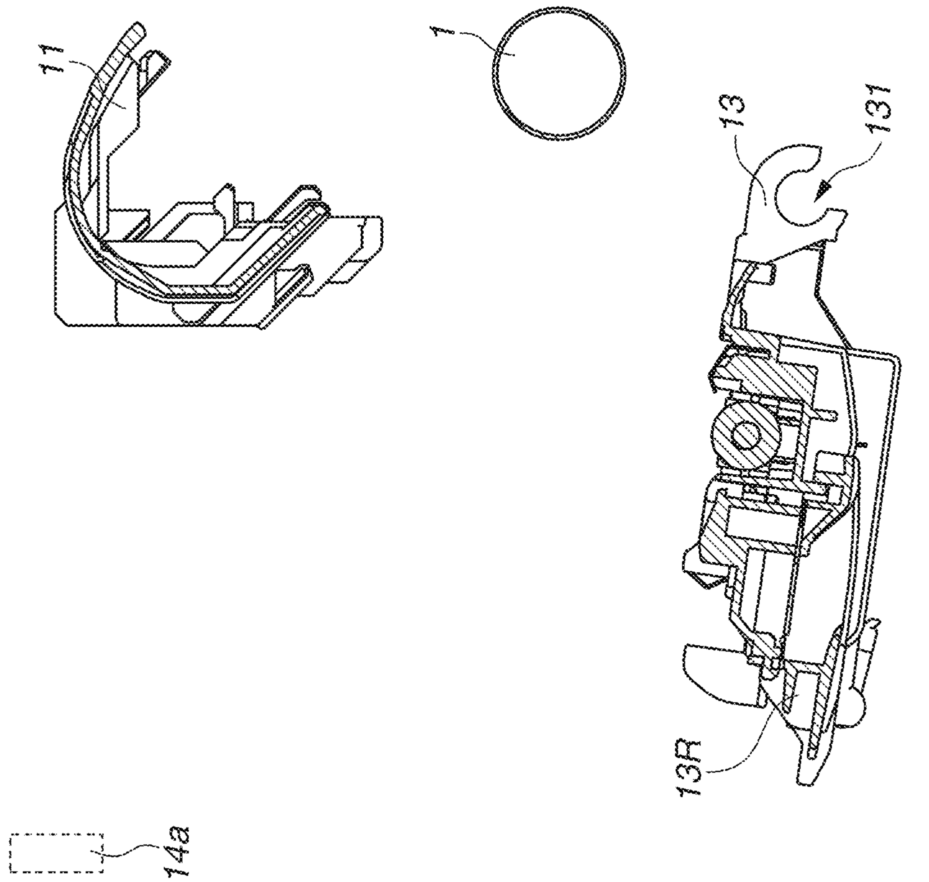
FIGS. 14A and 14B are still other cross-sectional views illustrating the two-sided printing guide and the transfer guide according to the present exemplary embodiment.
Figure 14A:
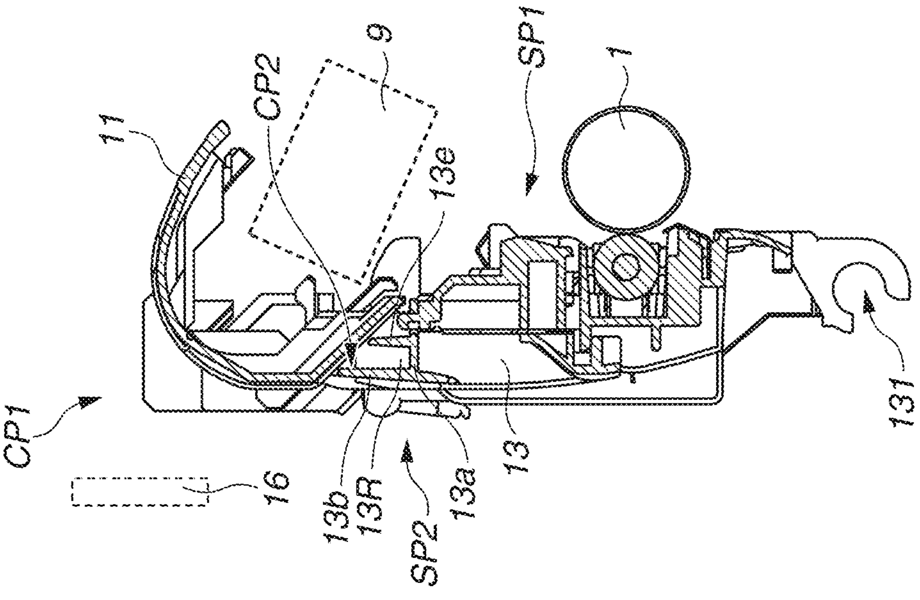

As illustrated in FIG. 14A, in a state where the transfer guide 13 is at the closed position, the bottom wall 13*a* extends in a direction intersecting with the vertical direction. According to the present exemplary embodiment, the bottom wall 13*a* extends in the horizontal direction.

The bottom wall 13*a*, the first side wall 13*b*, the second side wall 13*e*, and the plurality of side walls 13*c* are integrally formed on the transfer guide 13 to form the transfer receiving member 13R as a concave portion. More specifically, in a state where the transfer guide 13 is at the closed position, the first side wall 13*b*, the second side wall 13*e*, and the plurality of side walls 13*c* upwardly extend from the bottom wall 13*a* in the vertical direction. As a result, in a state where the transfer guide 13 is at the closed position, the transfer receiving member 13R as a concave portion is upwardly open with respect to the vertical direction. More specifically, the opening (entrance) of the transfer receiving member 13R is positioned above the bottom wall 13*a*.

In a state where the transfer guide 13 is at the closed position, the second side wall 13*e* is positioned between the first side wall 13*b* and the photosensitive drum 1 in the horizontal direction, and the height of the second side wall 13*e* is lower than the height of the first side wall 13*b*.

In a state where the transfer guide 13 is at the closed position, the transfer receiving member 13R is positioned below the first communication path CP1 and above the photosensitive drum 1 with respect to the vertical direction, and the bottom wall 13*a* faces the two-sided printing guide 11. In a state where the transfer guide 13 is at the closed position, the transfer receiving member 13R is positioned below the second communication path CP2 with respect to the vertical direction, and the bottom wall 13*a* faces the second communication path CP2.

As a result, the foreign substance D1 passing through the second communication path CP2 is stored in the transfer receiving member 13R, preventing the foreign substance D1 from adhering to the photosensitive drum 1. In a state where the transfer guide 13 is at the closed position, the transfer receiving member 13R is upwardly open with respect to the vertical direction. This prevents the foreign substance D1 received by the transfer receiving member 13R from moving to the photosensitive drum 1 when the transfer guide 13 is closed.

As illustrated in FIG. 14B, when the transfer guide 13 moves from the closed position to the open position, the transfer receiving member 13R moves away from the photosensitive drum 1. This prevents the foreign substance D1 received by the transfer receiving member 13R from adhering to the photosensitive drum 1 when the transfer guide 13 is opened.

Figure 15B:
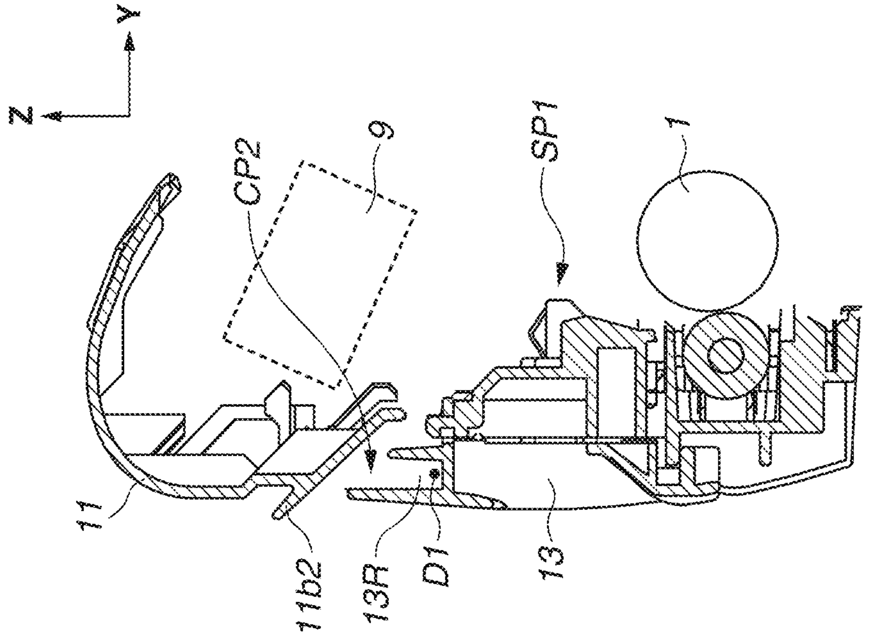
FIGS. 15A and 15B are still other cross-sectional views illustrating the two-sided printing guide and the transfer guide according to the present exemplary embodiment.
Figure 15A:
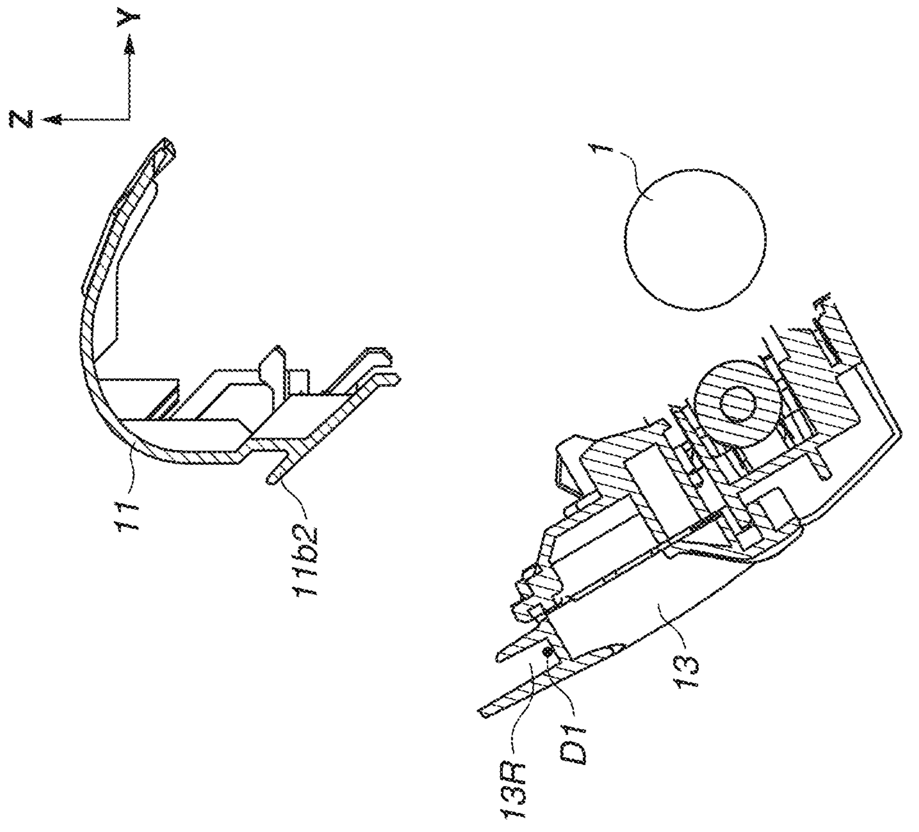

The transfer receiving member 13R may be disposed below the receiving ribs 11*b*1 and 11*b*2 of the two-sided printing guide 11. For example, as illustrated in FIGS. 15A and 15B, the transfer receiving member 13R disposed at an end of the transfer guide 13 with respect to the rotational axis direction of the photosensitive drum 1 is disposed below the receiving rib 11*b*2. The transfer receiving members 13R may be disposed below the receiving rib 11*b*1. More specifically, the position of the transfer receiving member 13R may overlap with the positions of the top faces of the receiving ribs 11*b*1 and 11*b*2 with respect to the rotational axis direction of the photosensitive drum 1. This also enables the transfer receiving member 13R to receive the foreign substance D1 dropping from the receiving ribs 11*b*1 and 11*b*2.

The receiving ribs 11*b*1 and 11*b*2 are not disposed above the transfer receiving member 13R disposed at the center of the transfer guide 13 with respect to the rotational axis direction of the photosensitive drum 1. More specifically, the position of the transfer receiving member 13R may not overlap with the positions of the top faces of the receiving rib 11*b*1 and 11*b*2 with respect to the rotational axis direction of the photosensitive drum 1.

Figure 16:
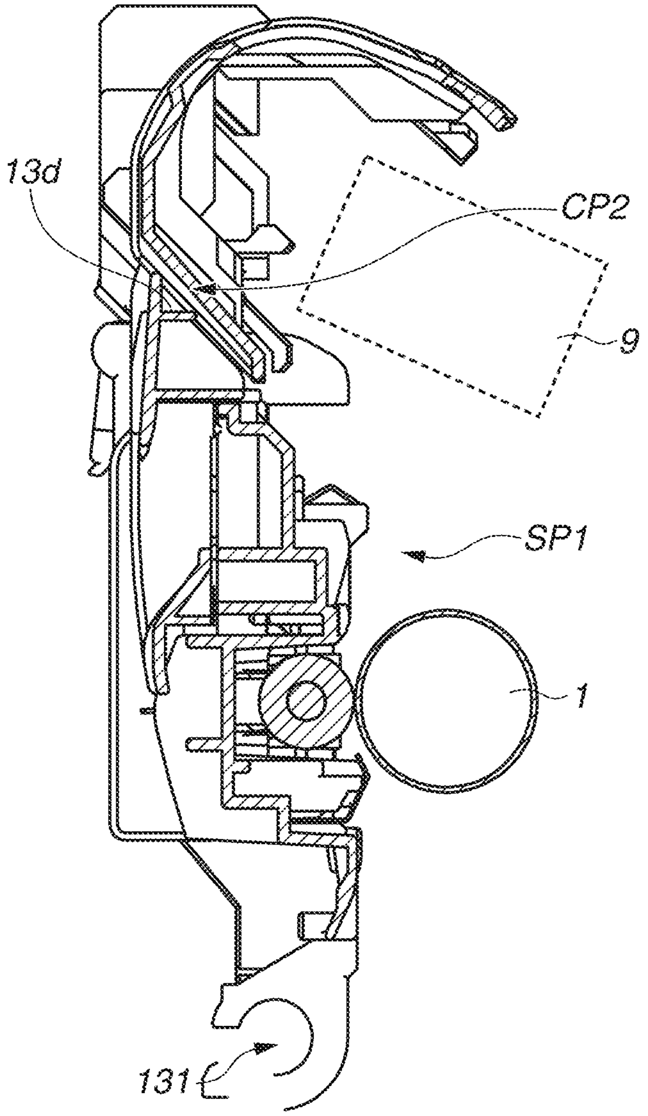
FIG. 16 is a cross-sectional view illustrating the two-sided printing guide and the transfer guide according to the present exemplary embodiment.

As illustrated in FIGS. 13B and 16, the transfer guide 13 includes an upper wall 13*d* projecting from the first side wall 13*b*. In a state where the transfer guide 13 is at the closed position, the upper wall 13*d* extends in a direction intersecting with the vertical direction, more specifically, extends from the first side wall 13*b* in the direction apart from the second opening 16. According to the present exemplary embodiment, the upper wall 13*d* extends in the horizontal direction in a state where the transfer guide 13 is at the closed position. When the transfer guide 13 moves from the closed position to the open position, the upper wall 13*d* moves away from the photosensitive drum 1.

The upper wall 13*d* prevents the foreign substance D1 from passing through the second communication path CP2 and adhering to the photosensitive drum 1. The position of the upper wall 13*d* may overlap with the positions of the top faces of the receiving ribs 11*b*1 and 11*b*2 with respect to the rotational axis direction of the photosensitive drum 1.

As illustrated in FIG. 13B, an uneven surface profile including a plurality of concave portions is provided at the leading end of the upper wall 13*d*. In a state where the transfer guide 13 is at the closed position, the second ribs 11*a*2 of the two-sided printing guide 11 are stored in the plurality of concave portions of the upper wall 13*d*.

According to the present exemplary embodiment, the upper wall 13*d* and the transfer receiving member 13R are closer to the upper end of the transfer guide 13 than to the rotation center 131 of the transfer guide 13. The upper wall 13*d* and the transfer receiving member 13R are closer to the first communication path CP1 than to the conveyance path SP1. Therefore, the foreign substance D1 can be received upstream of the second communication path CP2.

In addition to the two-sided printing guide 11 of which the evaluation results are illustrated in Table 1, the transfer guide 13 having the transfer receiving members 13R and the upper walls 13*d* was used to evaluate the adhesion of the foreign substance D1 to the photosensitive drum 1. In the present evaluation, 0.5 g of mineral powder simulating dust was used as in the evaluation of which the results are illustrated in Table 1.

Table 2 illustrates evaluation results of a configuration B including the two-sided printing guide 11 and the transfer guide 13 according to the present exemplary embodiment and the comparative example illustrated in FIGS. 8A and 8B.

TABLE 2

| | First evaluation | Second evaluation | Third evaluation |
|---|---|---|---|
| Comparative example | 60 | 72 | 55 |
| Configuration B | 23 | 25 | 20 |

Referring to Table 2, the two-sided printing guide 11 and the transfer guide 13 according to the present exemplary embodiment reduce the number of mineral powder particles to about 60% of the number according to the comparative example, preventing the foreign substance D1 on the two-sided printing guide 11 from adhering to the photosensitive drum 1.

As described above, the present disclosure enables preventing the foreign substance D1 from adhering to the photosensitive drum 1. The receiving ribs 11*b*1 and 11*b*2 of the two-sided printing guide 11, the transfer receiving member 13R, and the upper wall 13*d* have a function of preventing the foreign substance D1 from adhering to the photosensitive drum 1. Therefore, if the image forming apparatus 100 is provided with at least any one of the receiving ribs 11*b*1 and 11*b*2, the transfer receiving member 13R, and the upper wall 13*d*, the foreign substance D1 can be prevented from adhering to the photosensitive drum 1. This means that the image forming apparatus 100 does not need to be provided with all of the receiving ribs 11*b*1 and 11*b*2, the transfer receiving member 13R, and the upper wall 13*d*.

Modifications

The image forming apparatus 100 according to the present exemplary embodiment employs the cleaner-less method not using a cleaning member for cleaning the photosensitive drum 1. However, the present disclosure is also applicable to an image forming apparatus having a cleaning member for cleaning the photosensitive drum 1.

The image forming apparatus 100 according to the present exemplary embodiment uses a laser scanner unit as the exposure device 3. However, the present disclosure is also applicable to an image forming apparatus for exposing the photosensitive drum 1 by using light emitting diodes (LEDs).

The image forming apparatus 100 according to the present exemplary embodiment enables two-sided printing on the recording medium P. More specifically, the first communication path CP1 is a part of the two-sided conveyance path SP2. The present disclosure is also applicable to the image forming apparatus 100 that does not perform two-sided printing on the recording medium P. More specifically, the first communication path CP1 does not need to be a part of the two-sided conveyance path SP2, and the first rib 11*a1* and the second rib 11*a*2 do not need to function as guide ribs for guiding the recording medium P.

Although the image forming apparatus 100 according to the present exemplary embodiment is a monochromatic printer, the present disclosure is also applicable to color printers.

The present disclosure enables preventing foreign substances from adhering to the photosensitive drum.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-103929, filed Jun. 26, 2023, which is hereby incorporated by reference herein in its entirety.

What is claimed is:

1. An image forming apparatus for forming an image on a recording medium, the image forming apparatus comprising:

an apparatus main body including (i) a housing having a discharge portion and (ii) a door being openable and closable relative to the housing, the door including a wall disposed on an opposite side to the discharge portion with respect to a horizontal direction, wherein the discharge portion includes a first opening for discharging the recording medium, and the wall includes a second opening, the second opening including a plurality of holes;

a photosensitive drum stored in the apparatus main body, wherein the photosensitive drum is rotatable and disposed below the first opening and the second opening with respect to a vertical direction, and when viewed in a rotational axis direction of the photosensitive drum, the photosensitive drum is disposed between the first opening and the second opening in the horizontal direction;

a transfer member contacting the photosensitive drum such that a transfer portion, through which the recording medium passes, is formed between the photosensitive drum and the transfer member, wherein a toner image formed on the photosensitive drum is transferred onto the recording medium at the transfer portion;

a fixing unit configured to heat the recording medium, the fixing unit disposed above the photosensitive drum;

an opposed member facing a two-sided conveying path including a first communication path, the first communication path communicating with the first opening and the second opening, the opposed member including:

(i) an exposed surface stored in the apparatus main body, wherein the exposed surface is exposed toward the first communication path and disposed below the first communication path, (ii) a plurality of ribs arranged along the rotational axis direction of the photosensitive drum, wherein the plurality of ribs projects from the exposed surface toward the first communication path, and each of the plurality of ribs extends in a direction intersecting with the rotational axis direction, (iii) a receiving rib projecting from the exposed surface and including a receiving surface projecting from the exposed surface toward the first communication path; and an opening/closing member disposed below the opposed member and supporting the transfer member, and the opening/closing member being movable between (i) a closed position in which the opening/closing member covers the photosensitive drum and the transfer member is in contact with the photosensitive drum and (ii) an open position in which the photosensitive drum is exposed and the transfer member is separated from the photosensitive drum, wherein, in a state where the opening/closing member is at the closed position, a second communication path is formed between the opening/closing member and the opposed member, the second communication path is formed above the photosensitive drum and below the first communication path with respect to the vertical direction, and the second communication path communicates with a conveyance path through which the recording medium is conveyed from the photosensitive drum toward the fixing unit, and communicates with the two-sided conveying path, wherein the receiving surface is upwardly oriented with respect to the vertical direction and faces the first communication path, and the receiving surface extends along the rotational axis direction to connect with the plurality of ribs and is disposed to be positioned above the photosensitive drum with respect to the vertical direction, wherein the receiving surface is inclined relative to the vertical direction and the horizontal direction so that a leading end of the receiving surface is disposed above a root of the receiving surface connecting with the exposed surface, and wherein the receiving surface is positioned above the second communication path and when viewed in the rotational axis direction of the photosensitive drum, the receiving surface is closer to the second opening than to the first opening.

2. The image forming apparatus according to claim 1, wherein the exposed surface includes a curved surface, wherein the curved surface is upwardly curved with respect to the vertical direction and includes a first surface, and wherein the first surface is positioned on one side of an apex of the curved surface in the horizontal direction when viewed in the rotational axis direction, downwardly extending from the apex, and is positioned between the apex and a leading end of the receiving surface in the horizontal direction.

3. The image forming apparatus according to claim 2, wherein the first surface includes a curved portion.

4. The image forming apparatus according to claim 2, wherein the first surface is closer to the second opening than the apex is.

5. The image forming apparatus according to claim 2, wherein the curved surface includes a second surface positioned on the other side of the apex of the curved surface in the horizontal direction when viewed in the rotational axis direction, and downwardly inclined from the apex.

6. The image forming apparatus according to claim 1, wherein the plurality of ribs is configured to guide the recording medium.

7. The image forming apparatus according to claim 1, wherein, with respect to the rotational axis direction, a position of the receiving surface overlaps with a position of the photosensitive drum.

8. The image forming apparatus according to claim 1, wherein the opening/closing member includes (i) guide ribs configured to guide the recoding medium passing through the tow-sided conveyance path and (ii) a back surface disposed between the guide ribs, and wherein, in the state where the opening/closing member is at the closed position, the receiving rib projects toward the opposite side relative to the back surface with respect to the horizontal direction.

9. The image forming apparatus according to claim 1, wherein the receiving surface projects more than or equal to 1 mm from the exposed surface.

10. An image forming apparatus for forming an image on a recording medium, the image forming apparatus comprising:

an apparatus main body including (i) a housing having a discharge portion and (ii) a door being openable and closable relative to the housing, the door including a wall disposed on an opposite side to the discharge portion with respect to a horizontal direction, wherein the discharge portion includes a first opening for discharging the recording medium, and the wall includes a second opening, the second opening including a plurality of holes;

a photosensitive drum stored in the apparatus main body, wherein the photosensitive drum is rotatable and disposed below the first opening and the second opening with respect to a vertical direction, and when viewed in a rotational axis direction of the photosensitive drum, the photosensitive drum is disposed between the first opening and the second opening in the horizontal direction;

a transfer member contacting the photosensitive drum such that a transfer portion, through which the recording medium passes, is formed between the photosensitive drum and the transfer member, wherein a toner image formed on the photosensitive drum is transferred onto the recording medium at the transfer portion;

a fixing unit configured to heat the recording medium, the fixing unit disposed above the photosensitive drum;

an opposed member stored in the apparatus main body, wherein the opposed member faces a first communication path communicating with the first opening and the second opening and is disposed below the first communication path; and an opening/closing member disposed below the opposed member and supporting the transfer member, and the opening/closing member being movable between (i) a closed position in which the opening/closing member covers the photosensitive drum and the transfer member is in contact with the photosensitive drum and (ii) an open position in which the photosensitive drum is exposed and the transfer member is separated from the photosensitive drum, wherein the opening/closing member includes a bottom wall, a first side wall, a second side wall, a third side wall, and a fourth side wall, wherein the first side wall extends along the rotational axis direction of the photosensitive drum and connects with the bottom wall, wherein the second side wall extends along the rotational axis direction, connects with the bottom wall, and faces the first side wall, wherein the third side wall extends along a first direction intersecting with the rotational axis direction and connects with the bottom wall, the first side wall, and the second side wall, wherein the fourth side wall extends along a second direction intersecting with the rotational axis direction, connects with the bottom wall, the first side wall, and the second side wall, and faces the third side wall, wherein, in a state where the opening/closing member is at the closed position, the bottom wall extends in a direction intersecting with the vertical direction, and the first side wall, the second side wall, the third side wall, and the fourth side wall upwardly extend from the bottom wall with respect to the vertical direction to form an upwardly open concave portion with respect to the vertical direction, wherein the first side wall, the second side wall, the third side wall, and the fourth side wall, and the bottom wall are integrally disposed to form the upwardly open concave portion, and wherein, in the state where the opening/closing member is at the closed position, the upwardly open concave portion is positioned below the first communication path communicating with the first opening and the second opening and above the photosensitive drum with respect to the vertical direction, and the bottom wall faces the opposed member.

11. The image forming apparatus according to claim 10, wherein the opposed member faces a two-sided conveying path including the first communication path, wherein a second communication path is formed above the photosensitive drum and below the first communication path with respect to the vertical direction, and wherein the second communication path communicates with a conveyance path through which the recording medium is conveyed from the photosensitive drum toward the fixing unit, and communicates with the two-sided conveying path.

12. The image forming apparatus according to claim 11, wherein, in the state where the opening/closing member is at the closed position, the bottom wall faces the second communication path.

13. The image forming apparatus according to claim 11, wherein the opposed member includes (i) an exposed surface stored in the apparatus main body, wherein the exposed surface is exposed toward the first communication path and disposed below the first communication path, (ii) a plurality of ribs arranged along the rotational axis direction of the photosensitive drum, wherein the plurality of ribs projects from the exposed surface toward the first communication path, and each of the plurality of ribs extends in a direction intersecting with the rotational axis direction, (iii) a receiving rib projecting from the exposed surface and including a receiving surface projecting from the exposed surface toward the first communication path, wherein the receiving surface is upwardly oriented with respect to the vertical direction and faces the first communication path, and the receiving surface extends along the rotational axis direction to connect with the plurality of ribs and is disposed to be positioned above the photosensitive drum with respect to the vertical direction, and wherein the receiving surface is inclined relative to the vertical direction and the horizontal direction so that a leading end of the receiving surface is disposed above a root of the receiving surface connecting with the exposed surface.

14. The image forming apparatus according to claim 13, wherein a position of the upwardly open concave portion does not overlap with a positions of the receiving surface with respect to the rotational axis direction of the photosensitive drum.

15. The image forming apparatus according to claim 10, wherein, when the opening/closing member moves from the closed position to the open position, the upwardly open concave portion moves away from the photosensitive drum.

16. The image forming apparatus according to claim 10, wherein, in the state where the opening/closing member is at the closed position, the second side wall is positioned between the first side wall and the photosensitive drum in the horizontal direction, and a height of the second side wall is lower than a height of the first side wall.

17. The image forming apparatus according to claim 10, wherein, in a state where the opening/closing member is at the closed position, an upper end of the opening/closing member is positioned above the photosensitive drum with respect to the vertical direction.

18. The image forming apparatus according to claim 10, wherein the opening/closing member includes an upper wall projecting from the first side wall, and wherein in the state where the opening/closing member is at the closed position, the upper wall extends in a direction intersecting with the vertical direction, and the upper wall extends from the first side wall in a direction apart from the second opening.

19. The image forming apparatus according to claim 18, wherein the opposed member includes a rib extending in a direction intersecting with the rotational axis direction, and a concave portion is provided at a leading end of the upper wall, and wherein in the state where the transfer guide 13 is at the closed position, the rib is stored in the concave portion.

20. The image forming apparatus according to claim 10, wherein the housing is provided with a plurality of upper holes disposed above the first communication path.

21. The image forming apparatus according to claim 10, wherein the housing is provided with a plurality of upper holes disposed above the first communication path.

* * * * *